United States Patent
Kimura et al.

(10) Patent No.: US 12,216,351 B2
(45) Date of Patent: Feb. 4, 2025

(54) DISPLAY DEVICE

(71) Applicant: Japan Display Inc., Tokyo (JP)

(72) Inventors: Shunichi Kimura, Tokyo (JP); Toshiharu Matsushima, Tokyo (JP); Jin Hirosawa, Tokyo (JP); Yuji Maede, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 18/481,338

(22) Filed: Oct. 5, 2023

(65) Prior Publication Data

US 2024/0126115 A1 Apr. 18, 2024

(30) Foreign Application Priority Data

Oct. 18, 2022 (JP) .................... 2022-166918

(51) Int. Cl.
*G02F 1/1335* (2006.01)
*G02F 1/1343* (2006.01)

(52) U.S. Cl.
CPC .. *G02F 1/133526* (2013.01); *G02F 1/134336* (2013.01); *G02F 1/13439* (2013.01)

(58) Field of Classification Search
None
See application file for complete search history.

(56) References Cited

U.S. PATENT DOCUMENTS

| 7,369,482 B2 * | 5/2008 | Mizuyama ......... G02B 26/0858 369/112.29 |
| 11,988,924 B2 * | 5/2024 | Kurokawa ........ G02F 1/133345 |
| 2022/0206347 A1 | 6/2022 | Mitsui et al. |

FOREIGN PATENT DOCUMENTS

| JP | 2019003094 A | 1/2019 |
| JP | 2019086539 A | 6/2019 |
| JP | 2021051187 A | 4/2021 |

* cited by examiner

*Primary Examiner* — Dung T Nguyen
(74) *Attorney, Agent, or Firm* — Maier & Maier, PLLC

(57) ABSTRACT

According to one embodiment, an optical control element includes a plurality of lens forming regions along a first direction and a second direction orthogonal to the first direction, each of the lens forming regions includes an annularly shaped second electrode and a circularly shaped first electrode provided on an inner side of the second electrode, a plurality of first wiring lines connected to the first electrodes each include a first stem portion extending in a zigzag shape along the second direction and a plurality of first branch portions extending from the first stem, and each of the first branch portions overlap the plurality of first electrodes, respectively.

19 Claims, 22 Drawing Sheets

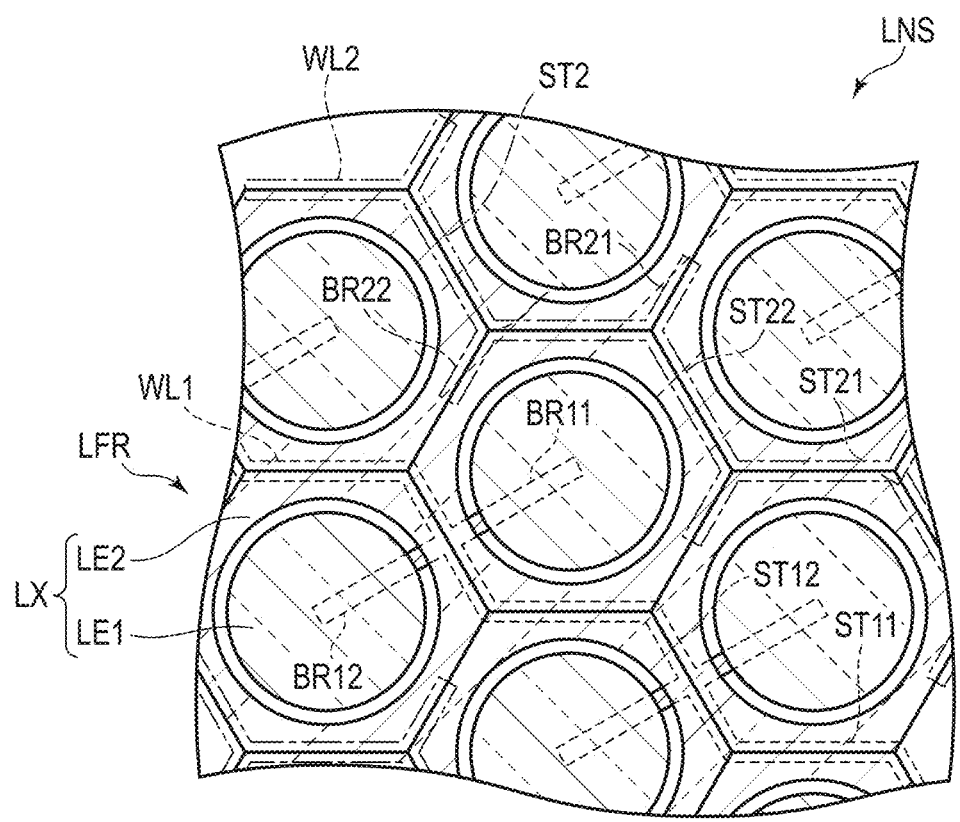
F I G. 19

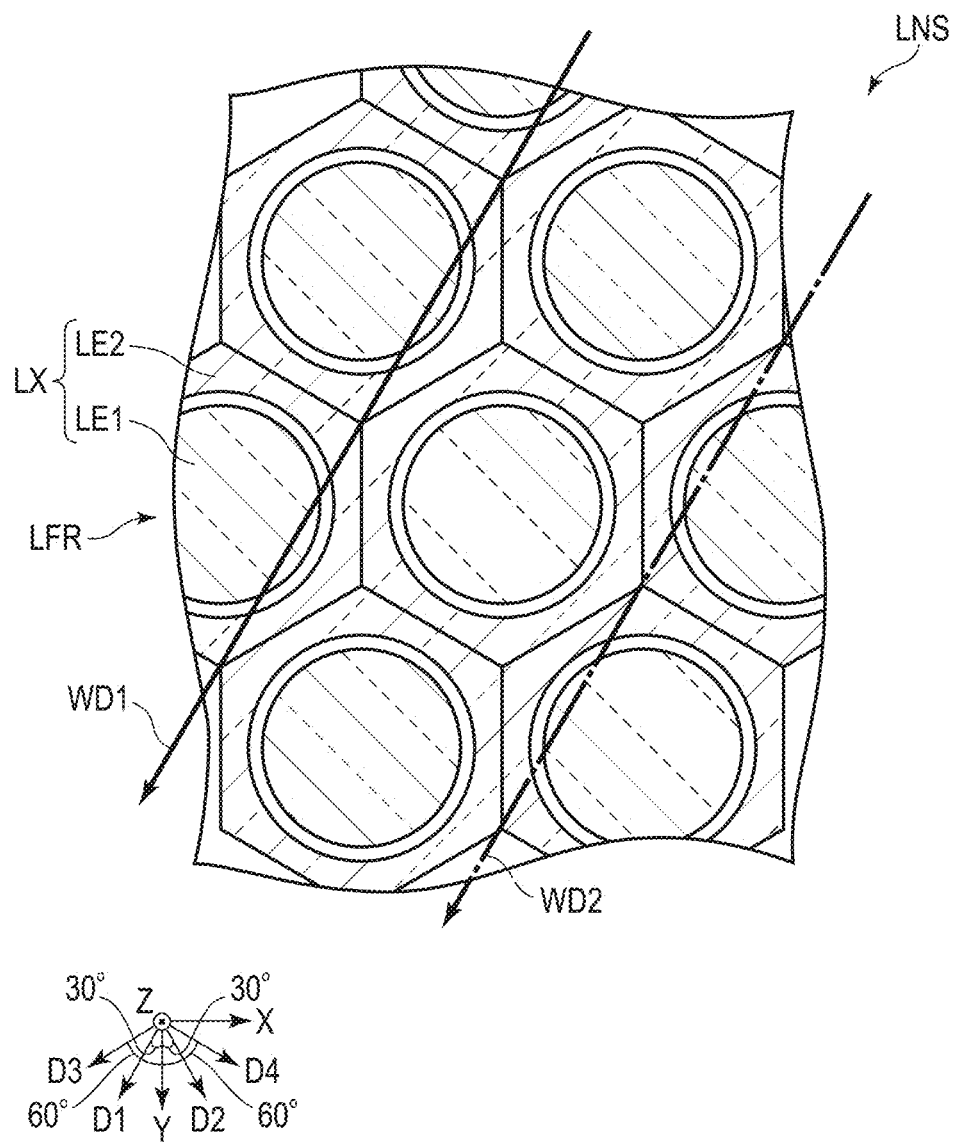
F I G. 20

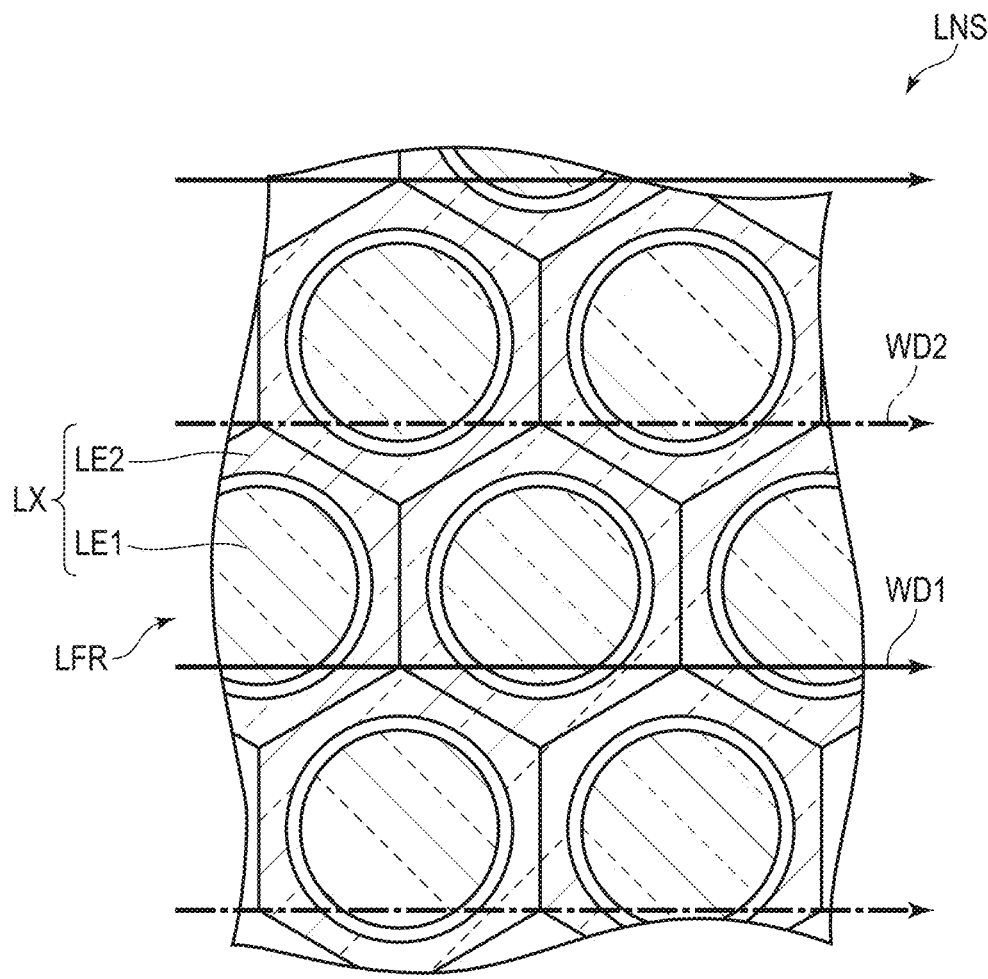
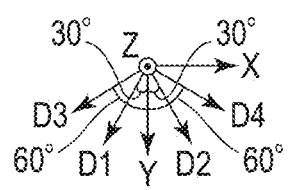
F I G. 21

DISPLAY DEVICE

CROSS-REFERENCE TO RELATED APPLICATIONS

This application is based upon and claims the benefit of priority from Japanese Patent Application No. 2022-166918 filed Oct. 18, 2022, the entire contents of which are incorporated herein by reference.

FIELD

Embodiments described herein relate generally to an optical control element.

BACKGROUND

Liquid crystal elements which can modulate liquid crystals by a voltage applied between electrodes and obtain a lens function have been developed.

BRIEF DESCRIPTION OF THE DRAWINGS

FIG. 19 is a plan view schematically showing a configuration example of the optical control element of Embodiment 3.
FIG. 20 is a plan view schematically showing another configuration example of the optical control element of Embodiment 3.
FIG. 21 is a plan view schematically showing another configuration example of the optical control element of Embodiment 3.

DETAILED DESCRIPTION

Figure 1:
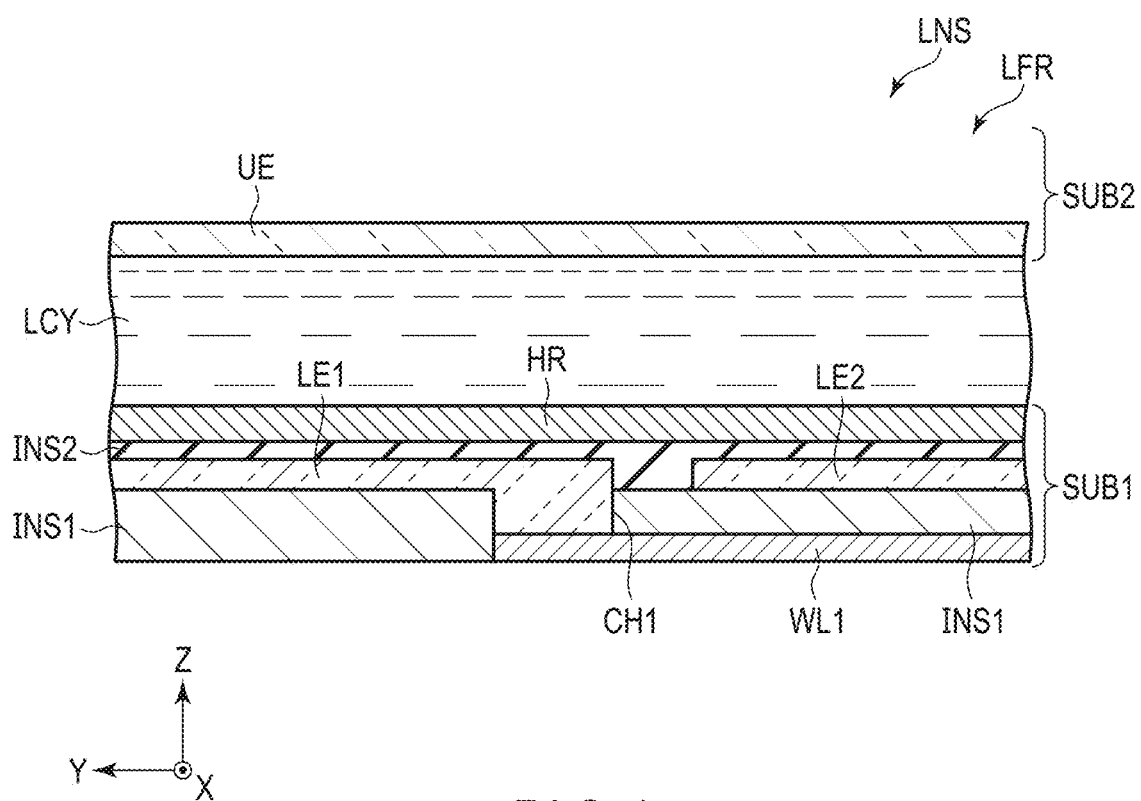
FIG. 1 is a cross-sectional view schematically showing a configuration example of an optical control element.

In general, according to one embodiment, an optical control element comprises
a plurality of lens forming regions arranged in a closest packed arrangement in plane and along a first direction and a second direction orthogonal to the first direction, each of the plurality of lens forming regions comprising an annularly shaped second electrode and a circularly shaped first electrode provided on an inner side of the second electrode;
a plurality of first wiring lines respectively connected to a plurality of the first electrodes each comprising a first stem portion extending in a zigzag shape along the second direction and a plurality of first branch portions extending from the first stem;
a plurality of second wiring lines connected to a plurality of the second electrodes each comprising a second stem portion extending in a zigzag shape along the second direction and a plurality of second branch portions extending from the second stem, wherein
the plurality of the first branch portions overlap the plurality of first electrodes, respectively.

According to another embodiment, an optical control element comprises
a plurality of lens forming regions arranged squarely along a first direction and a second direction orthogonal to the first direction, each of the plurality of lens-forming regions comprising an annularly shaped second electrode and a circularly shaped first electrode provided in an inner side the second electrode;
a plurality of first wiring lines each comprising a first stem portion extending along the second direction and a plurality of first branch portions extending from the first stem portion; and
a plurality of second wiring lines each comprising a second stem portion extending along the second direction and a plurality of second branch portions extending from the second stem portion,
the plurality of the first branch portions overlap the plurality of first electrodes, respectively.

According to still another embodiment, an optical control element comprises
a plurality of lens forming regions forming a honeycomb structure along a first direction and a second direction orthogonal to the first direction, each of the plurality of lens-forming regions comprising a second electrode comprising an outer side end portion of a hexagonal shape and an inner side end portion of a circular shape, and a first electrode having a circular shape, provided on an inner side of the second electrode,
wherein the plurality of first wiring lines each comprises a first stem portion extending in a zigzag shape along a predetermined direction, and a plurality of first branch portions extending from the first stem portion, and the plurality of first branch portions overlap the plurality of first electrodes, respectively.

According to still another embodiment, a liquid crystal element comprises a first substrate;

a second substrate; and a liquid crystal layer disposed between the first substrate and the second substrate, wherein the liquid crystal element comprises:

a plurality of electrode pairs forming a honeycomb structure along a first direction and a second direction orthogonal to the first direction, the plurality of electrode pairs form a plurality of rows along the second direction, and lines connecting centers of a respective pair of electrode pairs adjacent to each other, located in one of the plurality of rows, and one electrode pair included in a row adjacent to the one row along the first direction and in contact with the respective pair of adjacent electrode pairs, form an equilateral triangle, the first substrate comprises:

a plurality of circularly shaped first electrodes;

a plurality of second electrodes; and a high resistance layer provided on the plurality of first electrodes and a plurality of second electrodes, the second substrate comprises a third electrode, and each of the plurality of second electrodes comprises an outer side end portion of a hexagonal shape and an inner side end portion of a circular shape, the plurality of second electrodes are in contact with each other, each of the plurality of electrode pairs comprises the second electrode and the circularly shaped first electrode provided on an inner side of the second electrode, and each pair of first electrodes adjacent to each other along the second direction are connected to each other by a connection portion.

An object of this embodiment is to provide an optical control element with improved functions.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of an optical control element with reference to the drawings.

In this embodiment, a first direction X, a second direction Y and a third direction Z are orthogonal to each other, but may intersect at an angle other than 90°. The direction toward the tip of the arrow in the third direction Z is defined as up or above, and the direction opposite to the direction toward the tip of the arrow in the third direction Z is defined as down or below. Note that the first direction X, the second direction Y and the third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the optical control element on a tip side of the arrow in the third direction Z. Here, viewing from this observation position toward the X-Y plane defined by the first direction X and the second direction Y is referred to as plan view. Viewing a cross-section of the optical control element in the X-Z plane defined by the first direction X and the third direction Z or in the Y-Z plane defined by the second direction Y and the third direction Z is referred to as cross-sectional view.

Embodiment 1

FIG. 1 is a cross-sectional view schematically showing a configuration example of an optical control element. The optical control element LNS shown in FIG. 1 comprises a substrate SUB1, a substrate SUB2 and a liquid crystal layer LCY provided between the substrate SUB1 and the substrate SUB2. The substrate SUB1 comprises a wiring line WL1, an insulating layer INS1, an electrode LE1, an electrode LE2, an insulating layer INS2 and a high-resistance layer HR. The substrate SUB2 comprises an electrode UE.

The insulating layer INS1 is provided on the wiring line WL1. On the insulating layer INS1, the electrode LE1 is provided. The electrode LE1 is connected to the wiring line WL1 via a contact hole CH1 provided in the insulating layer INS1.

In the optical control element LNS shown in FIG. 1, the liquid crystal layer LCY is modulated by a voltage applied between the electrode LE1 and the electrode LE2 as well as the electrode UE to form a lens. In other words, the optical control element LNS is a liquid crystal lens. In the embodiment, one electrode LE1, one electrode LE2, an electrode UE and a liquid crystal layer LCY are referred to as a lens forming region LFR. Although only one lens forming region LFR is shown in FIG. 1, the optical control element LNS comprises a plurality of lens forming regions LFR. By combining the liquid crystal lenses with a display panel, for example, a liquid crystal display panel, a display device which can adjust light emitted from the pixels of the display panel can be realized.

In the substrate SUB1, the wiring line WL1 and the insulating layer INS1 are provided with a base not shown in the drawing. In the substrate SUB2, a base not shown in the drawing is provided on the electrode UE. Further, an alignment film not shown in the drawing is provided on the respective sides of the substrate SUB1 and the substrate SUB2 so as to be in contact with the liquid crystal layer LCY.

The wiring line WL1 is constituted by, for example, a metal layer, more specifically, a stacked body of molybdenum and tungsten (MoW) and a stacked body of indium tin oxide (ITO). The insulating layer INS1 can be, for example, an insulating layer containing silicon, more specifically, a silicon oxide layer or a silicon nitride layer. The electrode LE1 and the electrode LE2 are transparent conductive layers, for example, ITO layers. The insulating layer INS2 can be, for example, a silicon oxide layer.

On the electrode LE1 and the electrode LE2, the high-resistance layer HR is provided while interposing the insulating layer INS2 therebetween. The high-resistance layer HR is formed of a material with a higher resistance than that of the transparent conductive layer that forms the electrodes LE1 and LE2, that is, for example, indium gallium zinc oxide (IGZO). With the high-resistance layer HR thus provided, a gradation of voltage can be imparted to form a liquid crystal lens.

Figure 2:
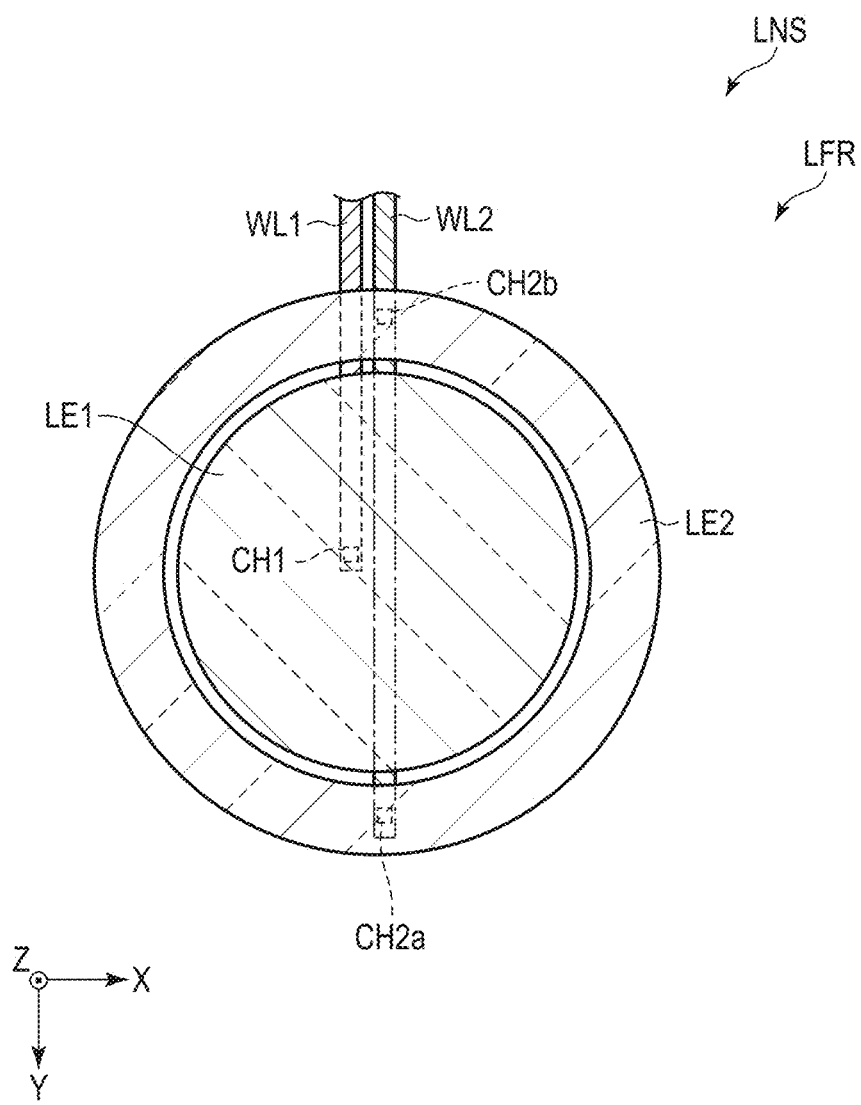
FIG. 2 is a plan view schematically showing a configuration of an optical control element of a comparative example.

FIG. 2 is a plan view schematically showing a configuration of an optical control element of a comparative example. In an optical control element LNS, a circularly shaped electrode LE1 is placed inside an annularly shaped electrode LE2.

A wiring line WL1 is provided to overlap the circularly shaped electrode LE1. The wiring line WL1 is connected to an electrode LE1 via a contact hole CH1. A wiring line WL2 is provided to overlap the annularly shaped electrode LE2. The wiring line WL2 is connected to an electrode LE2 via a contact hole CH2a and a contact hole CH2b. The combination of one electrode LE1 and one electrode LE2 forms one electrode pair LX. The area occupied by the electrode pair LX in plan view is equal to the area occupied by one lens forming region LFR.

Figure 3:
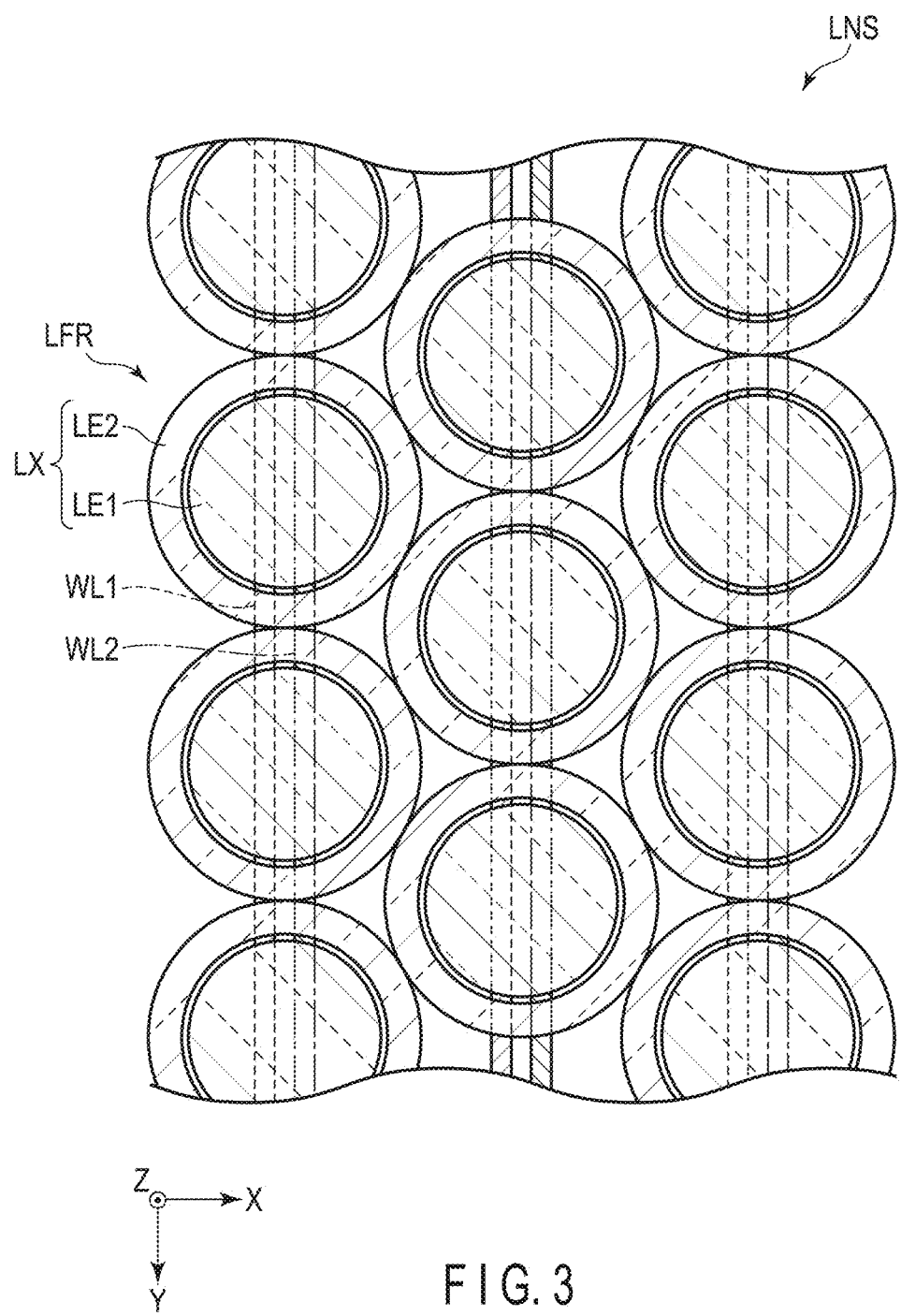
FIG. 3 is a plan view of a plurality of electrodes thus arranged each being shown in FIG. 2.

FIG. 3 is a plan view of a plurality of electrodes arranged each being shown in FIG. 2. A plurality of electrode pairs LX are arranged along the first direction X and the second direction Y so that they are arranged in the closest packed arrangement in a plane. The plurality of electrode pairs LX form a plurality of rows, arranged side by side along the second direction Y. The lines connecting the centers of the respective electrode pairs LX forming the plurality of rows are parallel to each other along the second direction Y. Further, those electrode pairs LX adjacent to each other in the first direction X and the second direction Y are in contact with each other. In other words, the electrodes LE2 of the adjacent electrode pairs LX are in contact with each other by their outermost end portions.

Let us consider two adjacent electrode pairs LX out of the electrode pairs LX included in one column. The two electrode pairs LX are in contact with one electrode pair LX in columns adjacent to each other along the first direction X. The lines connecting the centers of these three electrode pairs LX form an equilateral triangle.

Note that in FIG. 3, the explanation is made using the electrode pairs LX because it is a plan view, but as described above, the area occupied by the electrode pairs LX is equal to the area occupied by the lens forming regions LFR. Therefore, the arrangement of the electrode pairs LX is equal to that of the lens forming regions LFR.

The wiring line WL1 and the wiring line WL2 are commonly provided for a plurality of electrode pairs LX arranged along the first direction X. The wiring line WL1 is connected to the plurality of electrodes LE1. The wiring line WL2 is connected to the plurality of electrodes LE2.

The electrode LE1 and the electrode LE2 of each electrode pair LX are transparent conductive layers as described above. On the other hand, the wiring line WL1 and the wiring line WL2 include a metal layer. That is, the regions of the electrode LE1 and the electrode LE2 where the wiring line WL1 and the wiring line WL2 overlap, respectively, are light-shielded. When the light-shielded region becomes wider, the function of the liquid crystal lens is deteriorated. The wiring line WL1 and the wiring line WL2 should preferably not overlap the electrode LE1 and the electrode LE2 as much as possible.

Figure 4:
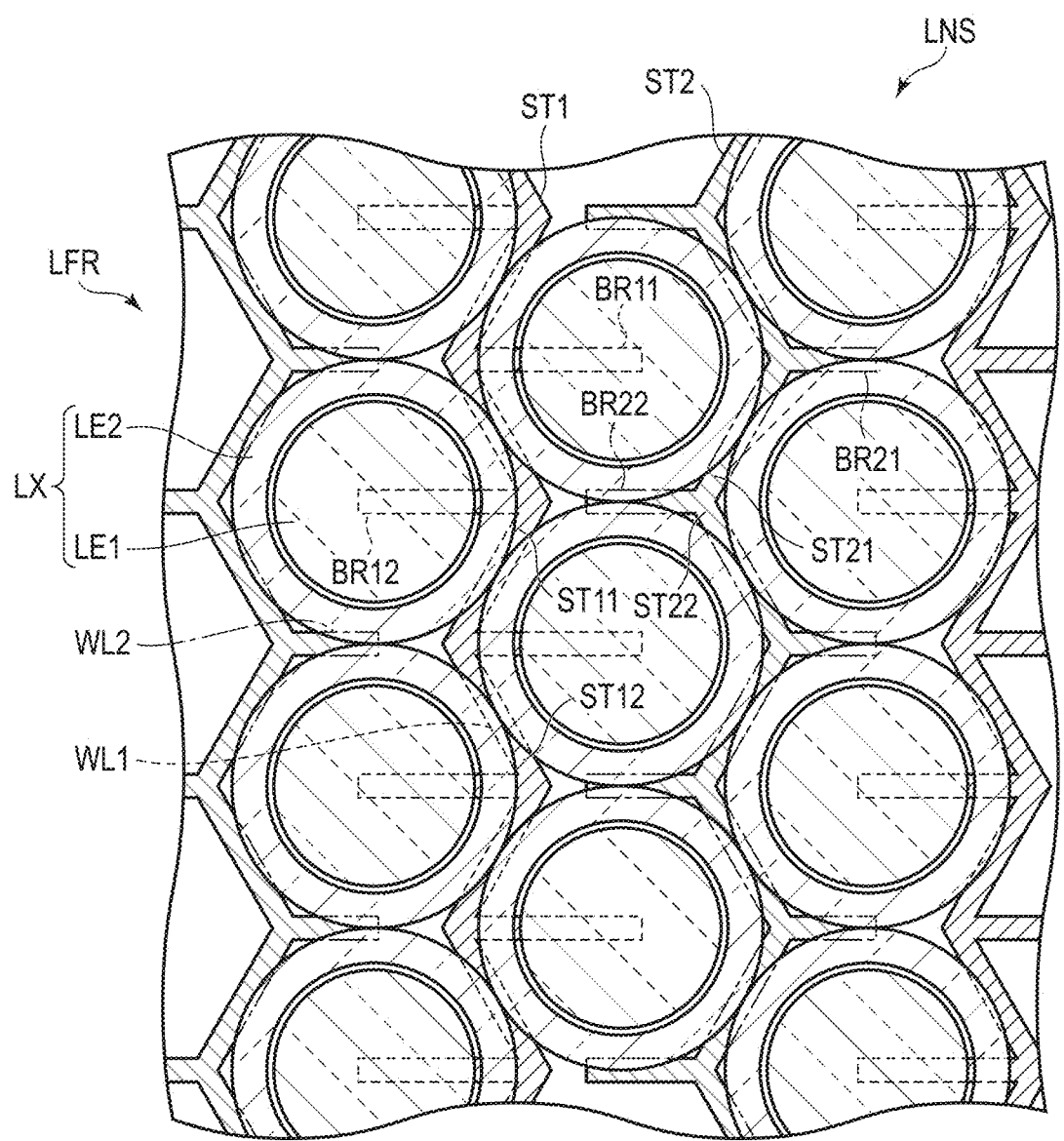
FIG. 4 is a plan view schematically showing a configuration example of an optical control element of Embodiment 1.

FIG. 4 is a plan view schematically showing a configuration example of the optical control element of Embodiment 1. In the optical control element LNS shown in FIG. 4, the arrangement of the electrode pairs LX (electrodes LE1 and LE2) is similar to that of FIG. 3.

On the other hand, the wiring line WL1 and the wiring line WL2 each includes a stem portion extending in a zigzag shape along the second direction Y and a branch portion extending parallel to the first direction X from the stem. In FIG. 4, the directions of extension of the stem portion and the branch portion are orthogonal, that is, they intersect at 90°.

In FIG. 4, the direction inclined by 30° clockwise from the second direction Y is defined as D1 and the direction inclined by 30° counterclockwise from the second direction Y is defined as D2. In this disclosure, the directions D1 and D2 may as well be referred to as a third direction and a fourth direction, respectively, following the first direction X and the second direction Y.

The wiring line WL1 comprises a segment ST11 extending along the direction D1, a segment ST12 extending along the direction D2, a segment BR11 extending along the first direction X from the connection portion of the segment ST11 and the segment ST12, a segment BR12 extending along a direction opposite to the first direction X from the connection portion of the segment ST11 and the segment ST12.

Note that in this disclosure, a direction parallel to a predetermined direction includes a predetermined direction and a direction opposite to the predetermined direction. For example, the first direction X and the direction opposite to the first direction X are both parallel to the first direction X. It can be said that the segment BR11 and the segment BR12 extend from the connection portion of the segment ST11 and the segment ST12 along a direction parallel to the first direction X.

The segment ST11 and the segment ST12 are connected to each other to form a stem portion ST1. The stem portion ST1 is located between each respective pair of electrodes LE2 adjacent to each other along the first direction X and the second direction Y. The direction in which the stem portion ST1 extends is the second direction Y. In other words, it can be said that the wiring line WL1 has a zigzag shape and extends along the second direction Y. Further, it can be said that the segment ST11 and the segment ST12 which constitute the stem portion ST1 extend in the directions (directions D1 and D2) inclined by 30° clockwise and counterclockwise, respectively, with respect to the second direction Y, which is the direction in which the wiring line WL1 extends.

The segment BR11 extends to the center of the circularly shaped electrode LE1 and is connected to the center via a contact hole not shown in the drawing. The segment BR12 is connected to another electrode LE1 adjacent in the first direction X and second direction Y to the electrode LE1 to which the segment BR11 is connected. When the segment BR11 and the segment BR12 are not to be distinguished from each other, they are referred to as branch portions BR1.

It can be said that the branch portions BR1 (segments BR11 and BR12) are orthogonal to the direction in which the wiring line WL1 extends (the direction in which the stem portion ST1 extends), that is, they intersect each other at 90°.

The wiring line WL2 comprises a segment ST21 extending along the direction D1, a segment ST22 extending along the direction D2, a segment BR21 extending along the direction X1 from the connection portion of the segment ST21 and the segment ST22 and a segment BR22 extending along an opposite direction to the direction X1 from the connection portion of the segment ST21 and the segment ST22.

The segment ST21 and the segment ST22 are connected to each other to form a stem portion ST2. The stem portion ST2 is located between each respective pair of electrodes LE2 adjacent to each other along the first direction X and the second direction Y. The direction in which the stem portion ST2 extends is the second direction Y. In other words, it can be said that the wiring line WL2 has a zigzag shape and extends along the second direction Y. It can be said that the segment ST21 and the segment ST22 which constitute the stem portion ST2 extend in a direction inclined by 30° clockwise and counterclockwise (direction D1 and direction D2), respectively, from the second direction Y, which is the direction in which the wiring line WL2 extends.

When the segment BR21 and the segment BR22 are not to be distinguished from each other, they are referred to as branch BR2. It can be said that the branch portions BR2 (segment BR21 and segment BR22) are orthogonal to the direction in which the wiring line WL2 extends (the direction in which the stem portion ST2 extends), that is, they intersect each other at 90°.

The segment BR21 overlap the annularly shaped electrode LE2 and is connected to the electrode LE2 via a contact hole not shown in the drawing. One segment BR21 is provided between each respective pair of electrodes LE2 adjacent to each other along the second direction Y. Further, each pair of segments BR21 adjacent to each other along the second direction Y are connected to the same electrode LE2. Each pair of segments BR21 adjacent to each other is connected to the region of the annularly shaped electrode LE2, which opposes thereto while interposing the circularly shaped electrode LE1 therebetween.

The segment BR22 is connected to the electrode LE2 another electrode LE2 adjacent thereto along the first direction X and the second direction Y to which the segment BR21 is connected. One segment BR22 is provided between each respective pair of electrodes LE2 adjacent to each other along the second direction Y. Each pair of segments BR22 adjacent to each other along the second direction Y are connected to the same electrode LE2. Each adjacent pair of segments BR22 is connected to the region of the annularly shaped electrode LE2, which oppose thereto while interposing the circularly shaped electrode LE1 therebetween.

The stem portion ST1 of the wiring line WL1 and the stem portion ST2 of the wiring line WL2 shown in FIG. 4 are located between each of the electrode pairs LX. The branch BR2 of the wiring line WL2 is located between each adjacent pair of the electrodes LE2. Note here that only the branch BR1 of the wiring line WL1 overlaps the electrode LE1. With this configuration, the regions of the electrode LE1 and electrode LE2 that are shielded by the wiring line WL1 and WL2 can be suppressed. Thus, it is possible to improve the function of the liquid crystal lens.

Configuration Example 1 of Embodiment 1

Figure 5:
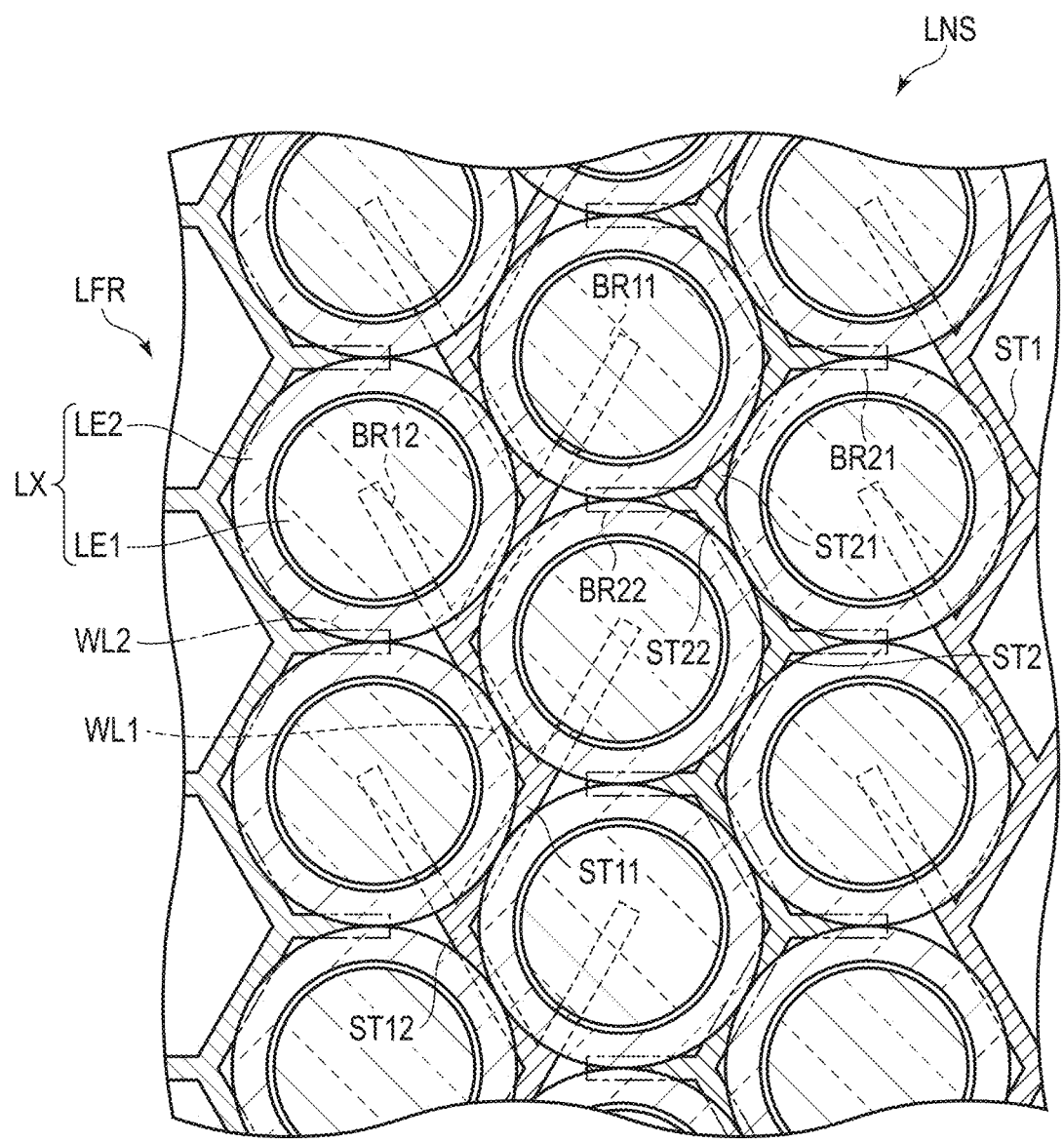
FIG. 5 is a plan view schematically showing another configuration example of the optical control element of Embodiment 1.

FIG. 5 is a plan view of another configuration example of the optical control element in Embodiment 1. The configuration example shown in FIG. 5 is different from that of FIG. 4 in the shape of the wiring lines.

In the optical control element LNS shown in FIG. 5, the wiring lines WL2 are similar to those shown in FIG. 4.

Further, in the wiring lines WL1, the stem portions ST1 as well are similar to those shown in FIG. 4. The stem portions ST1 are each formed from a segment ST11 extending along the direction D1 and a segment ST12 extending along the direction D2. The direction D1 is inclined by 30° clockwise with respect to the second direction Y, and the direction D2 is inclined by 30° counterclockwise with respect to the second direction Y, as in the case of FIG. 4.

In each wiring line WL1 shown in FIG. 5, a segment BR11 and a segment BR12 extend in directions parallel to those of the segment ST11 and the segment ST12, respectively.

The segment BR11 extends from the connection portion of the segment BR11 and the segment BR12 along a direction opposite to the direction D1. In other words, the segment BR11 and the segment ST11 constitute an electrode segment extending along the direction D1.

The segment BR12 extends from the connection portion of the segment BR11 and the segment BR12 along a direction opposite to direction D2. In other words, the segment BR12 and the segment ST12 constitute an electrode segment extending along the direction D2.

This configuration example as well has a configuration similar to that of Embodiment 1.

Configuration Example 2 of Embodiment 1

Figure 6:
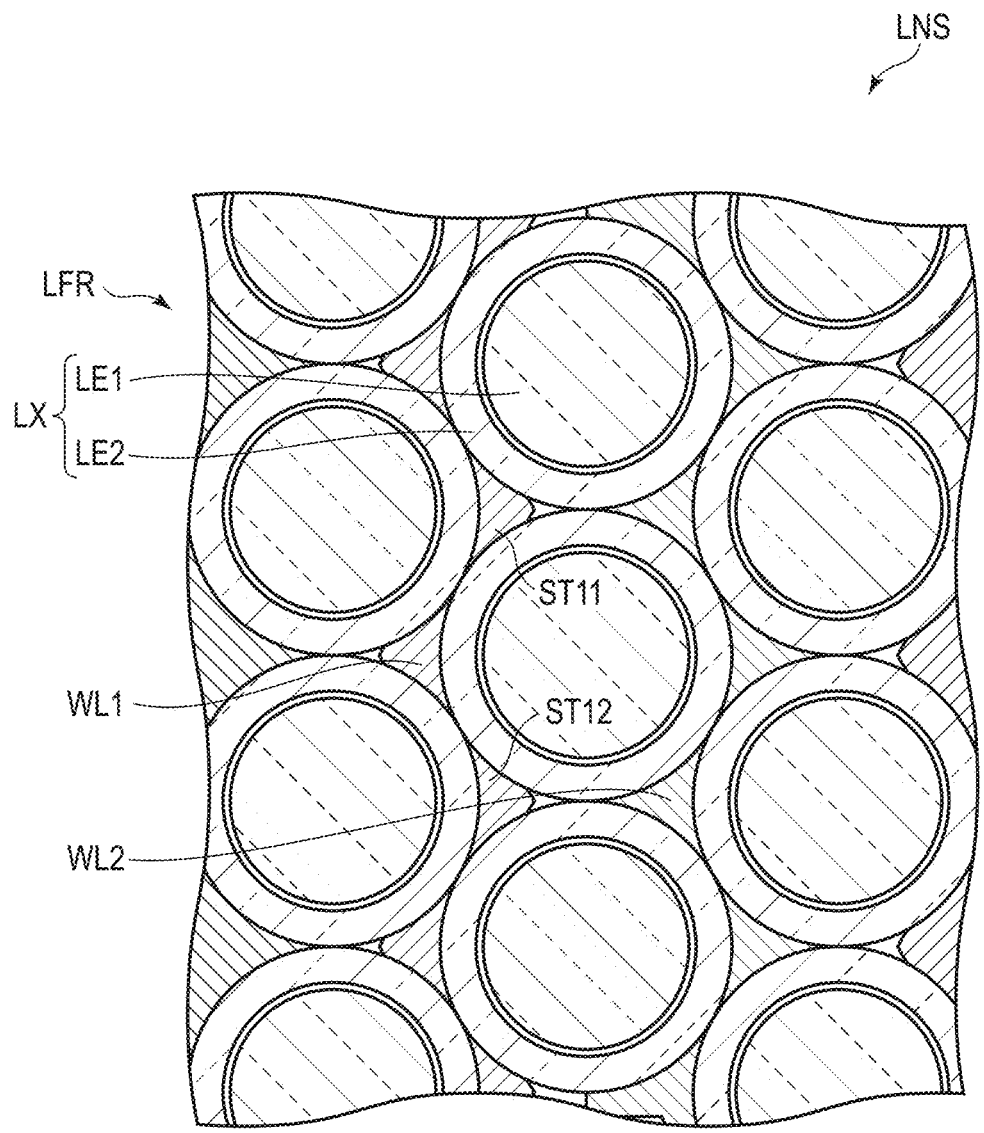
FIG. 6 is a plan view schematically showing another configuration example of the optical control element of Embodiment 1.
Figure 7:
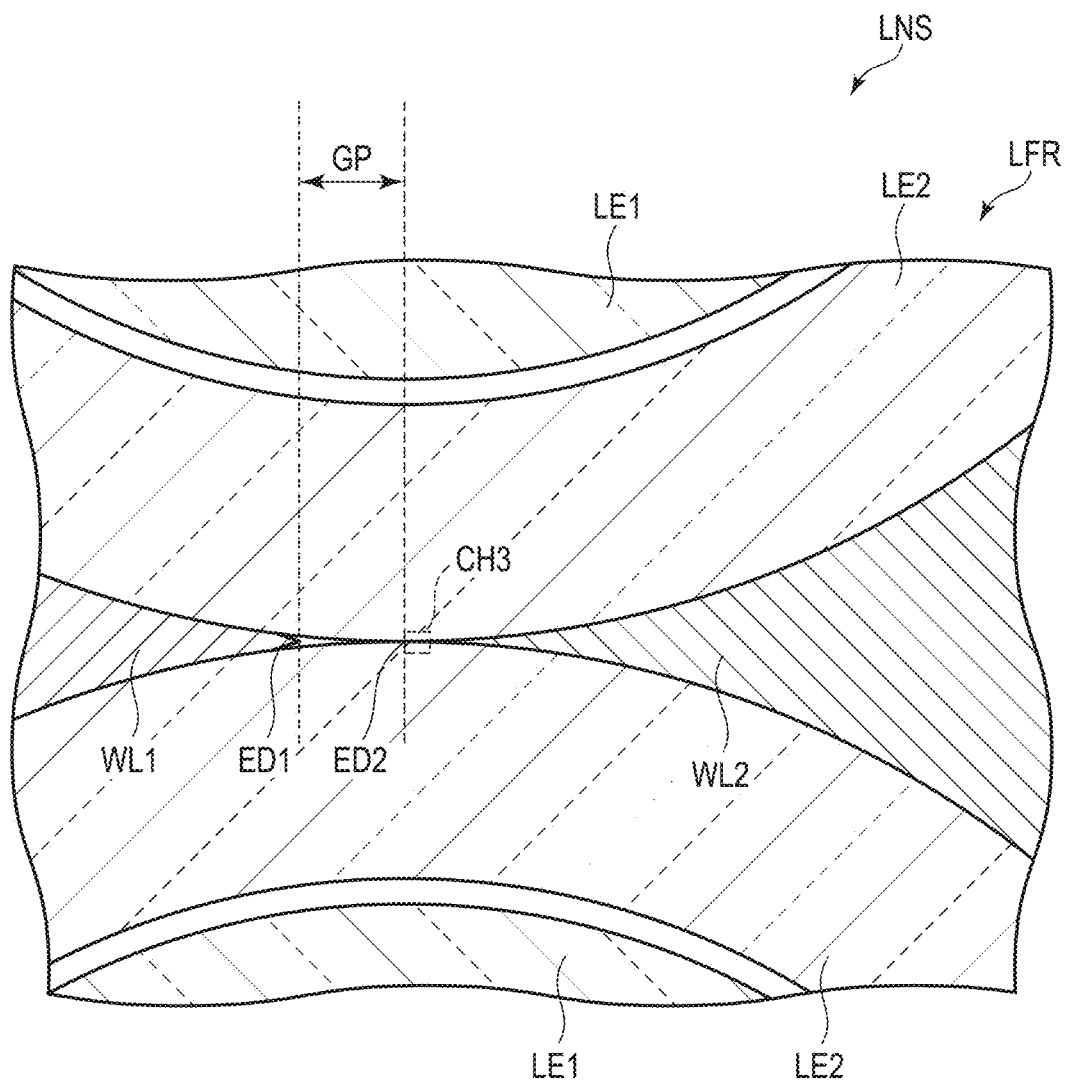
FIG. 7 is a partially enlarged view of the illustration of FIG. 6.

FIG. 6 is a plan view of another configuration example of the optical control element in Embodiment 1. The configuration example shown in FIG. 6 is different from that of FIG. 4 in that the wiring lines fill the space between each of the electrode pairs. FIG. 7 is an enlarged view of the illustration of FIG. 6.

In the optical control element LNS shown in FIGS. 6 and 7, the wiring line WL1 and the wiring line WL2 do not comprise branch portions, but only stems. Each wiring line WL1 is provided to fill the space between each adjacent pair of electrode pairs LX, more specifically, between each respective pair of electrodes LE2 adjacent to each other along the first direction X and the second direction Y. The end portion of each wiring line WL1 is referred to as ED1.

Similarly, each wiring line WL2 is provided so as to fill the space between each adjacent pair of electrode pairs LX and, more specifically, between each respective pair of electrodes LE2 adjacent to each other along the first direction X and the second direction Y. The end portion of each wiring line WL2 is referred to as ED2.

The end portion ED1 and the end portion ED2 are closest to each other near an apex of the annularly shaped electrode LE2. The apex is the point where an imaginary line passing through the center of the annular shape intersects the outermost circumference of the annular shape. A distance GP between the end portion ED1 and the end portion ED2 should preferably be 5 μm or more (GP≥5 μm).

Note that the annularly shaped electrode LE2 is connected to the respective wiring line WL2 through the contact hole CH3 in the region near the apex.

The circular shaped electrode LE1 is separated from the respective wiring line WL1. Therefore, it is necessary to provide a branch that extends from the stem of the wiring line WL1 to the region overlapping the electrode LE1. The branch portion may as well be a branch portion extending along the first direction X (see FIG. 4) or a branch portion extending along a direction inclined from the second direction Y (see FIG. 5).

Figure 8:
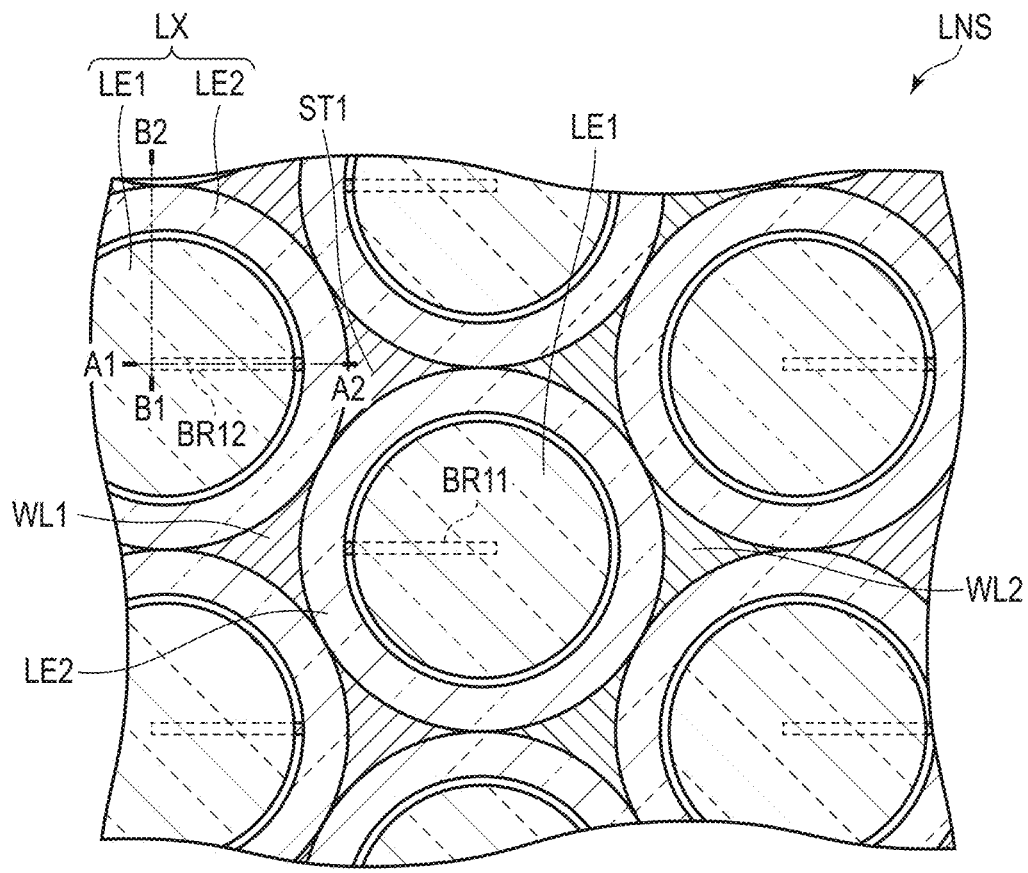
FIG. 8 is a diagram schematically showing a configuration example of an optical control element.

FIG. 8 is a diagram schematically showing a configuration example of the optical control element. In the optical control element LNS shown in FIG. 8, there are provided a segment BR11 and a segment BR12 extending from the wiring line WL1 shown in FIG. 6 along a direction parallel to the first direction X.

The wiring line WL1 shown in FIG. 6 is referred to, in FIG. 8, as the stem portion ST1 of the wiring line WL1. The segment BR11 extends from the stem portion ST1 along the first direction X and overlaps the circularly shaped electrode LE1. The segment BR12 extends from the stem portion ST1 along a direction opposite to the first direction X and overlaps the circularly shaped electrode LE1.

Note that the wiring line WL1 (stem portion ST1) and the wiring line WL2 shown in FIG. 8 should preferably arranged so that the distance between their respective ends is 5 μm or more, as in the case of FIG. 6.

Figure 9:
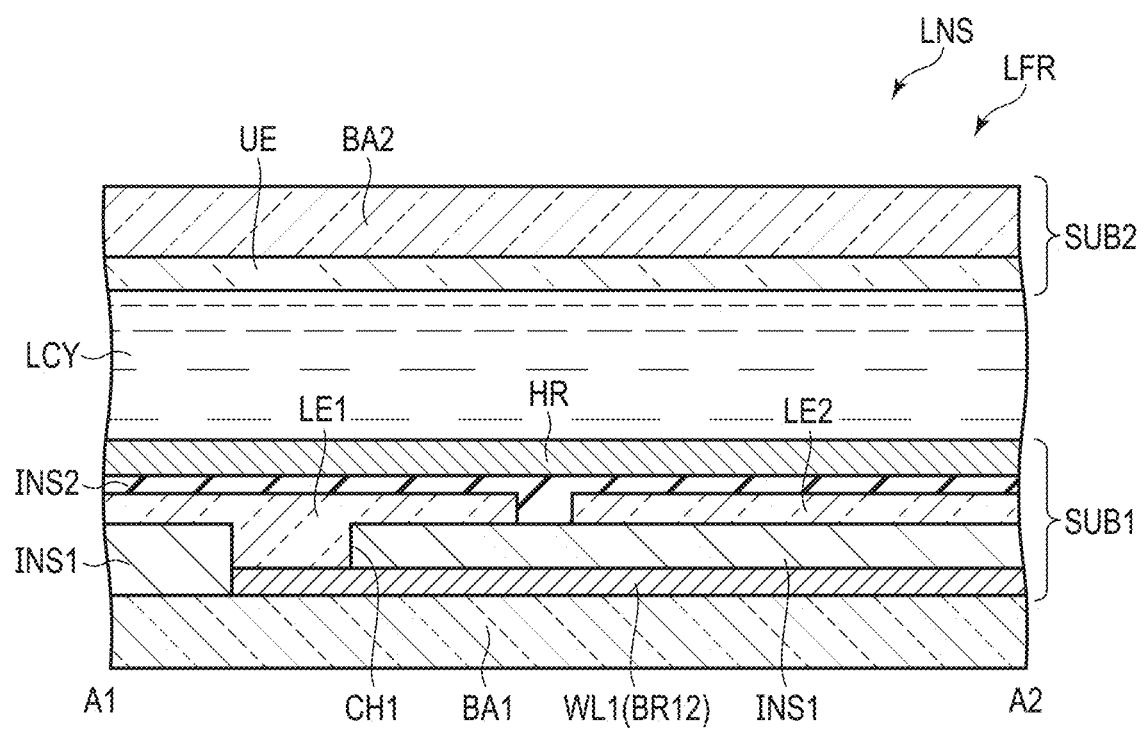
FIG. 9 is a cross-sectional view of the optical control element taken along line A1-A2 shown in FIG. 8.
Figure 9:
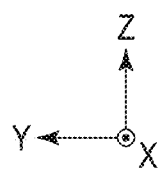
Figure 10:
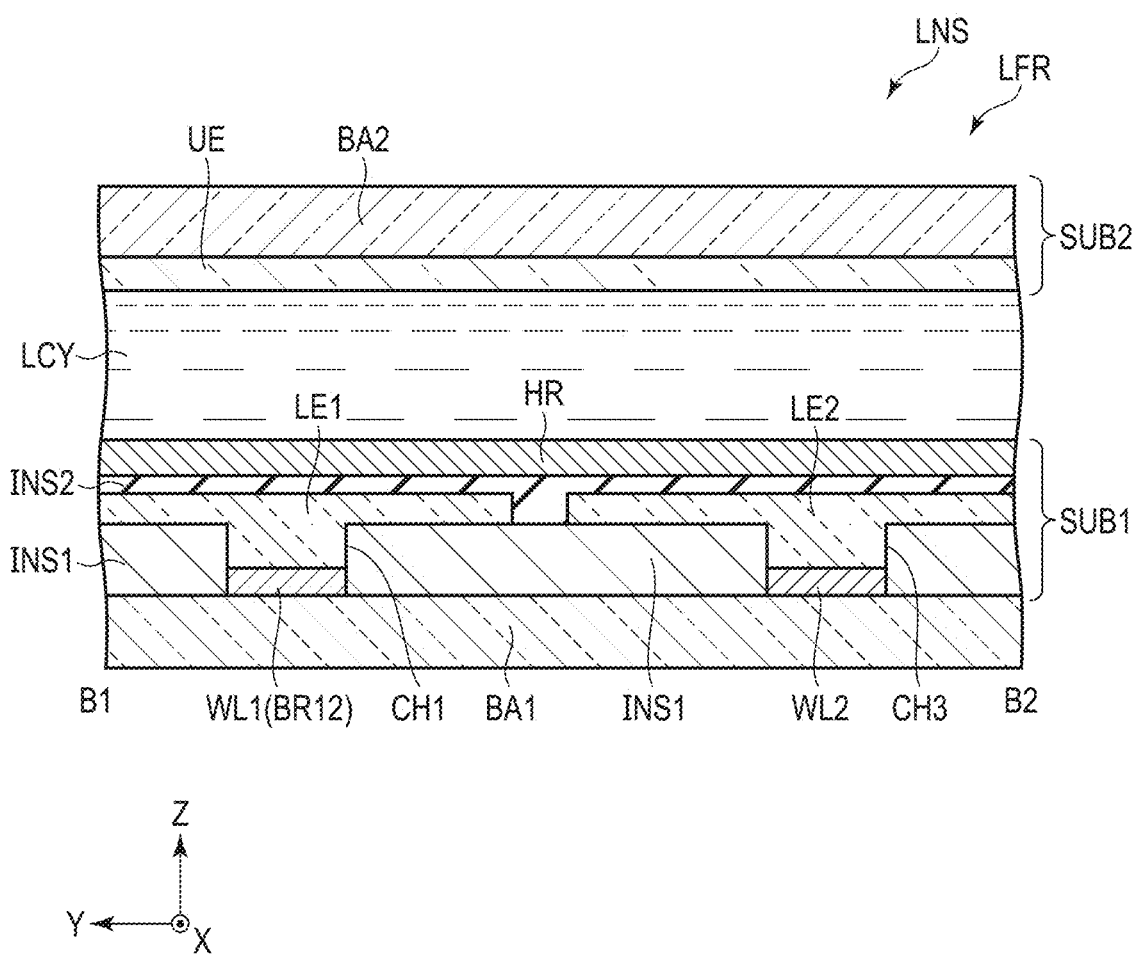
FIG. 10 is a cross-sectional view of the optical control element taken along line B1-B2 shown in FIG. 8.

FIG. 9 is a cross-sectional view of the optical control element taken along line A1-A2 shown in FIG. 8. FIG. 10 is a cross-sectional view of the optical control element taken along line B1-B2 shown in FIG. 8.

As shown in FIGS. 9 and 10, the wiring line WL1 and the insulating layer INS1 of the substrate SUB1 are formed on a base BA1. The electrode UE of the substrate SUB2 is provided in contact with a base BA2. The base BA1 and the base BA2 can be, for example, a translucent insulating material, more specifically, glass.

As shown in FIGS. 9 and 10, the electrode LE1 is connected to the wiring line WL1 via the contact hole CH1 provided in the insulating layer INS1. As shown in FIG. 10, the electrode LE2 is connected to the wiring line WL2 via a contact hole CH3 (see FIG. 7) provided in the insulating layer INS1.

In this configuration example, advantageous effects similar to those of Embodiment 1 can be exhibited.

Configuration Example 1 of Embodiment 1

Figure 11:
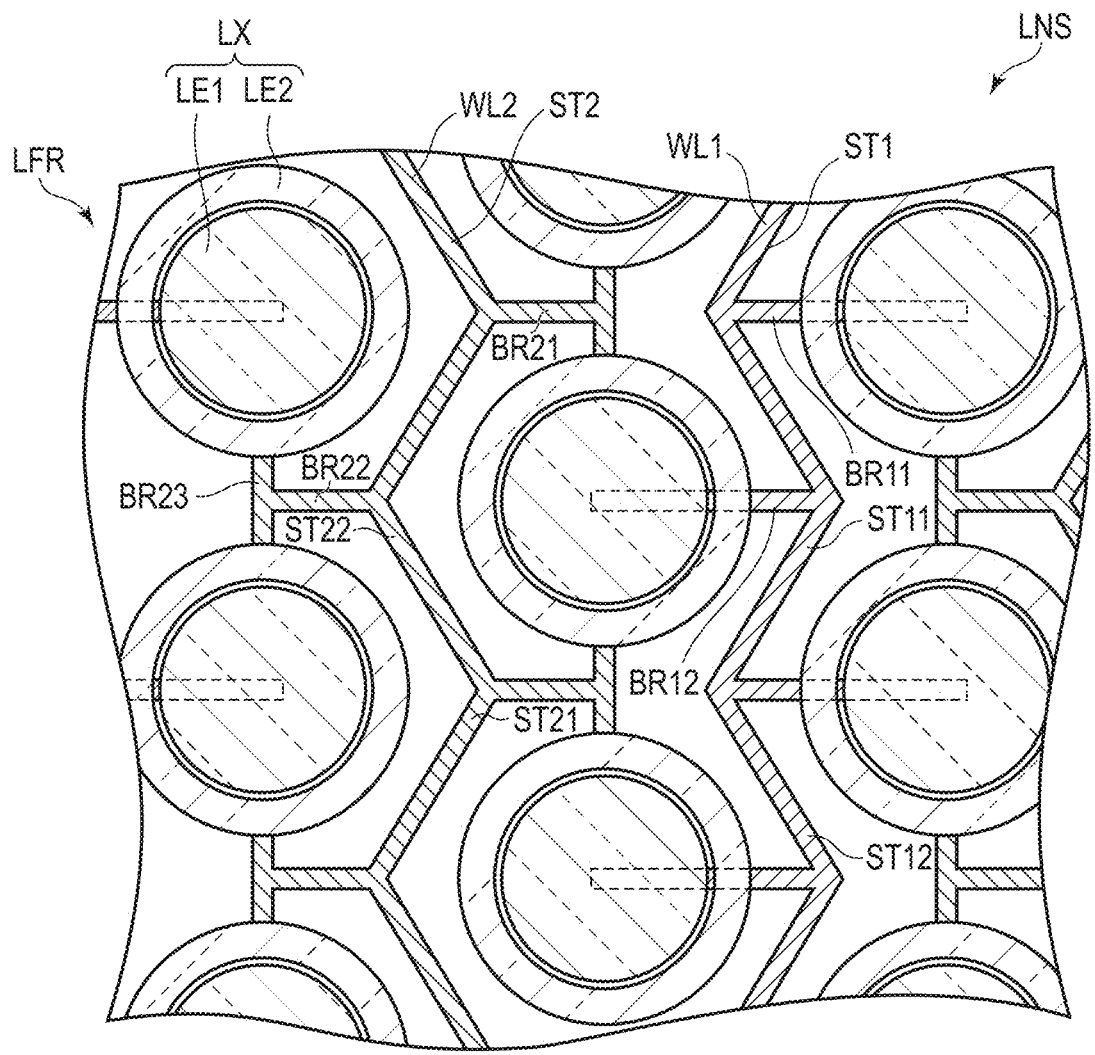
FIG. 11 is a plan view showing another configuration example of the optical control element of Embodiment 1.

FIG. 11 is a plan view of another configuration example of the optical control element in Embodiment 1. The configuration example shown in FIG. 11 is different from that of FIG. 4 in that the adjacent electrode pairs are separated from each other.

In the optical control element LNS shown in FIG. 11, a plurality of electrode pairs LX are not in contact with each other, but are separated from each other. In other words, there is a gap between each respective pair of electrode pairs LX adjacent to each other along the second direction Y and between each adjacent pair of rows of lens forming regions. But note that this configuration is similar to that of FIG. 4 in the respect that in two adjacent electrode pairs LX in one row and one electrode pair LX in a row adjacent thereto along the first direction X, the line connecting the centers of these forms an equilateral triangle.

The wiring line WL1 comprises a segment ST11 extending along the direction D1, a segment ST12 extending along the direction D2, a segment BR11 extending along the first direction X and a segment BR12 extending along a direction opposite to the first direction X.

The segment ST11 and the segment ST12 are connected to each other in a staggered configuration as described above to form a stem portion ST1.

The segment BR11 extends in the first direction X from the connection portion of the segment ST11 and the segment ST12. The segment BR12 extends in a direction opposite to the first direction X from the connection portion of the segment ST11 and the segment ST12. The segment BR11 and the segment BR12 each extend to the center of the circularly shaped electrode LE1. The segment BR11 and the segment BR12 are connected to the central portion of the electrode LE1 via contact holes not shown in the drawing.

The wiring line WL2 comprises a segment ST21 extending along the direction D1, a segment ST22 extending along the direction D2, a segment BR21 extending from the connection portion of the segment ST21 and the segment ST22 along the direction X1, a segment BR22 extending along a direction opposite to the direction X1 from the connection portion of the segment ST21 and the segment ST22, and a segment BR23 extending along the second direction Y.

The segment ST21 and the segment ST22 are connected to each other in a staggered configuration as described above to form a stem portion ST2.

The segment BR21 extends in the first direction X from the connection portion of the segment ST21 and the segment ST22. The segment BR22 extends from the connection portion of the segment ST21 and the segment ST22 in a direction opposite to the first direction X. The segment BR23 is provided between the electrodes LE2 of each respective pair of electrode pair LX adjacent to each other along the second direction Y. The segment ST21 and the segment ST22 are each connected to the segment BR23. The segment BR23 is connected to two electrodes LE2 via a contact hole not shown in the drawing.

In this configuration example as well, advantageous effects similar to those of Embodiment 1 can be exhibited.

Embodiment 2

Figure 12:
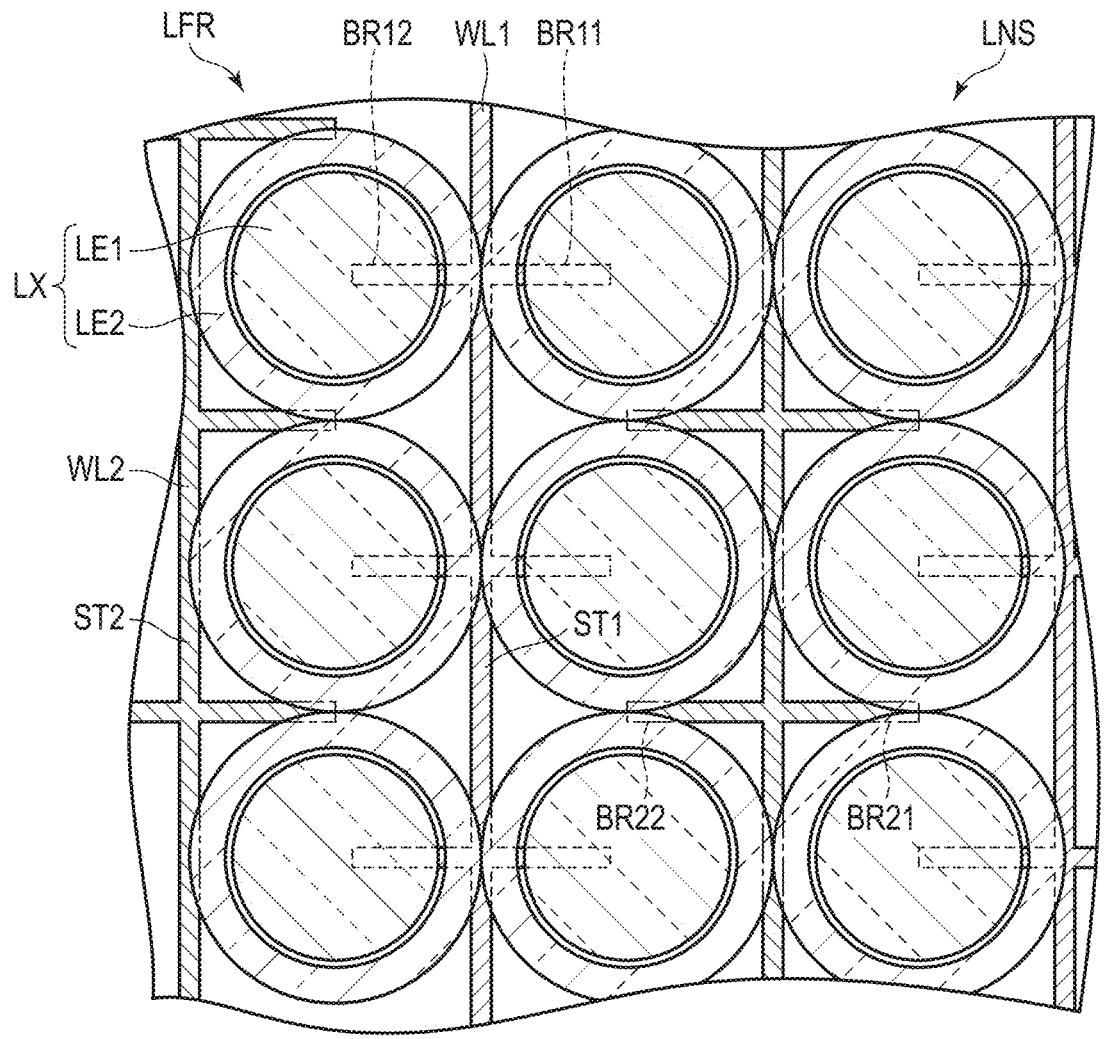
FIG. 12 is a plan view schematically showing a configuration example of an optical control element of Embodiment 2.

FIG. 12 is a plan view schematically showing a configuration example of an optical control element of Embodiment 2. The configuration example shown in FIG. 12 is different from that of FIG. 4 in that the electrode pairs are arranged in a square configuration.

In a plurality of electrode pairs LX, electrode pairs LX adjacent to each other along the first direction X from rows. In the plurality of electrode pairs LX, electrode pairs LX adjacent to each other along the second direction Y from columns. Electrodes LE2 of the plurality of electrode pairs LX are in contact with each other along each of the first direction X and the second direction Y. The lines connecting the centers of the plurality of electrode pairs LX forms squares along the first direction X and the second direction Y, respectively.

Let us consider now two electrode pairs LX adjacent to each other along the first direction X. The lines connecting the centers of each of the two electrode pairs LX and the electrode pairs LX adjacent thereto along the second direction Y form a square.

The wiring line WL1 includes a stem portion ST1 extending along the second direction Y, a segment BR11 extending from the stem portion ST1 along the first direction X, and a segment BR12 extending from the stem portion ST1 along a direction opposite to the first direction X.

The stem portion ST1 is provided between electrodes LE2 of each respective pair of electrode pairs LX adjacent to each other along the first direction X. The segment BR11 extends to the central portion of the electrode LE1 of the electrode pair LX and overlaps the electrode LE1. The segment BR12 extends to the central portion of the electrode LE1 of the electrode pair LX and overlaps the electrode LE1. One segment BR11 and one segment BR12 extend from the same region of the stem portion ST1. That is, the segment BR11 and the segment BR12 constitute a wiring line extending along a direction parallel to the first direction X. Each of the segment BR11 and the segment BR12 is connected to the central portion of the respective electrode LE1 via a contact hole not shown in the drawing.

The wiring line WL2 includes a stem portion ST2 extending along the second direction Y, a segment BR21 extending from the stem portion ST2 along the first direction X, and a segment BR22 extending from the stem portion ST2 along a direction opposite to the first direction X.

The stem portion ST2 is provided between electrodes LE2 of each respective pair of electrode pairs LX adjacent to each other along the first direction X. The segment BR21 extends to the apex of the electrode LE2 of the respective electrode pair LX and overlaps the electrode LE1. The segment BR22 extends to the apex of the electrode LE2 of the respective electrode pair LX and overlaps the electrode LE2. One segment BR21 and one segment BR22 extend from the same region of the stem portion ST2. That is, the segment BR21 and the segment BR22 constitute a wiring line extending along a direction parallel to the first direction X. Each of the segment BR21 and the segment BR22 is connected to two electrodes LE2 via a contact holes not shown in the drawing.

In Embodiment 2, as in the case of Embodiment 1, only the branch BR1 of the electrode WL1 overlaps the electrode LE1 of the electrode pair LX. With this configuration, the regions of the electrode LE1 and the electrode LE2, which are light-shielded by the wiring line WL1 and the wiring line WL2 can be suppressed. Thus, it is possible to improve the function of the liquid crystal lens.

Configuration Example 1 of Embodiment 2

Figure 13:
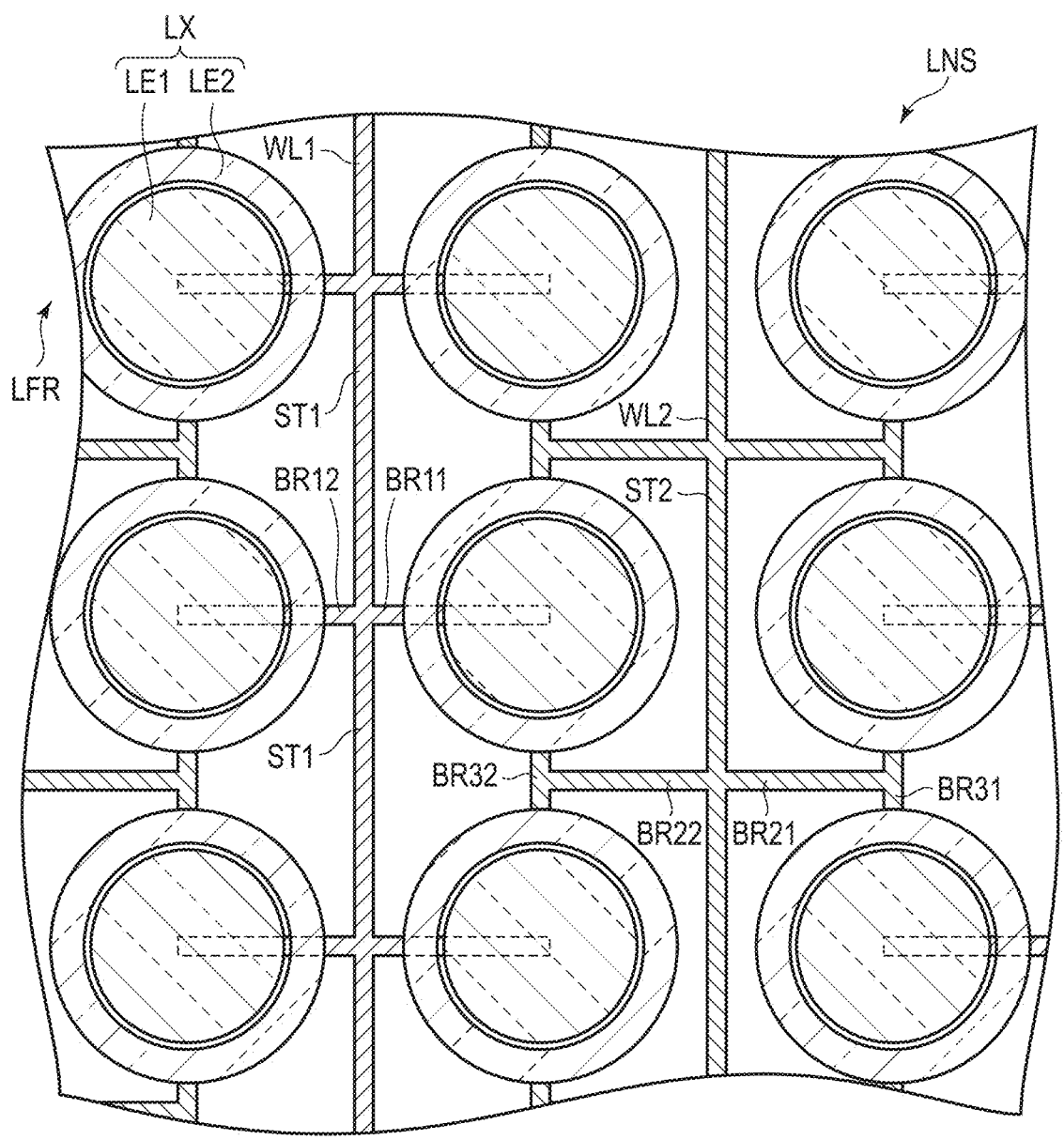
FIG. 13 is a plan view schematically showing another configuration example of the optical control element of Embodiment 2.

FIG. 13 is a plan view schematically showing a configuration example of the optical control element of Embodiment 2. The configuration example shown in FIG. 13 is different from that of FIG. 12 in that the electrode pairs are spaced apart along the first direction X and the second direction Y.

The wiring line WL1 shown in FIG. 13 has a shape similar to that of the wiring line WL1 shown in FIG. 12.

The wiring line WL2 includes a stem portion ST2 extending along the second direction Y, a segment BR21 extending from the stem portion ST2 along the first direction X, a segment BR22 extending from the stem portion ST2 along a direction opposite to the first direction X, a segment BR31 extending along the second direction Y and a segment BR32 extending along the second direction Y.

The stem portion ST2, the segment BR21 and the segment BR22 shown in FIG. 13 have shapes similar to those of the stem portion ST2, the segment BR21 and the segment BR22 shown in FIG. 12, respectively.

The segment BR31 and the segment BR32 shown in FIG. 13 are provided between the electrodes LE2 of a respective pair of electrode pairs LX adjacent to each other along the second direction Y and are connected to two electrodes LE2 via contact holes not shown in the drawing. The segment BR31 extends from an end portion of the segment BR21 along the second direction Y. The segment BR32 extends from an end portion of the segment BR22 along the second direction Y.

In this configuration example as well, advantageous effects similar to those of Embodiment 2 can be exhibited.

Embodiment 3

Figure 14:
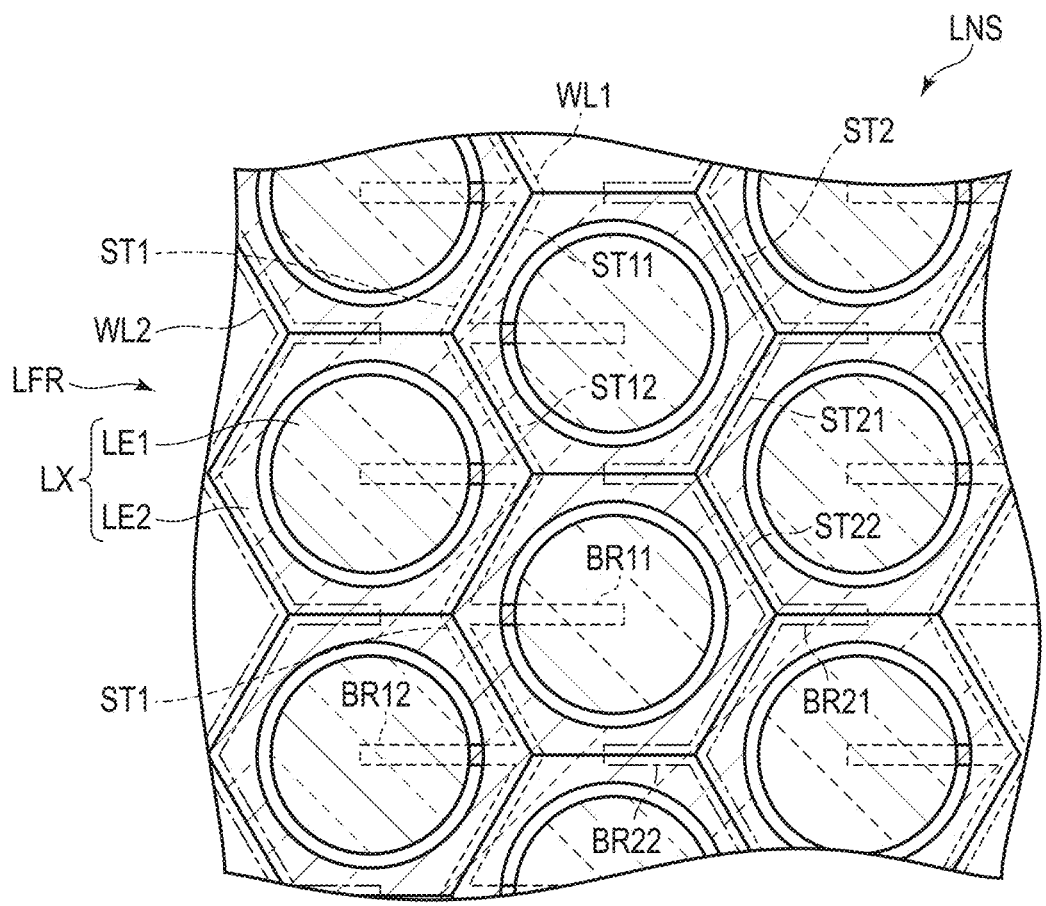
FIG. 14 is a plan view schematically showing a configuration example of an optical control element of Embodiment 3.

FIG. 14 is a plan view schematically showing a configuration example of an optical control element of Embodiment 3. The configuration example shown in FIG. 14 is different from that of FIG. 4 in that the outer shape of the electrode pair is hexagonal.

An electrode LE2 of each electrode pair LX shown in FIG. 14 include an outer edge portion having a hexagonal shape and inner edge portion having a circular shape. The electrode LE1 has a circular shape as in the cases described above. The electrode LE1 is spaced apart from the inner edge portion of the electrode LE2. Since the outer edge portion of the electrode LE2 is hexagonal in shape, the electrode pair LX as a whole is a hexagonal electrode pair. As described above, the area occupied by the electrode pair LX is equal to the area occupied by the lens forming region LFR in plan view. Therefore, it can be said that the lens forming region LFR is also hexagonal in plan view.

Since each electrode pair LX has a hexagonal shape, a plurality of electrode pairs LX can form a honeycomb structure. That is, the hexagonal-shaped electrode pairs LX are regularly arranged without gaps therebetween. Between a respective pair of electrode pairs LX adjacent to each other along the second direction Y, one electrode pair LX is arranged along the first direction X. The lines connecting the centers of the three electrode pairs LX constitute an equilateral triangle.

Since each of the electrode pairs LX has a hexagonal shape, no gap is created between any two electrode pairs LX adjacent to each other. In other words, the electrodes LE2 adjacent to each other are electrically connected.

The wiring line WL1 and the wiring line WL2 each include a stem portion extending in a zigzag shape along the second direction Y and a branch portion extending parallel to the first direction X from the stem.

Note that in FIG. 14, as in the case described above, the direction inclined by 30° clockwise from the second direction Y is referred to as D1, and the direction inclined by 30° counterclockwise from the second direction Y is referred to as D2.

The wiring line WL1 comprises a segment ST11 extending along the direction D1, a segment ST12 extending along the direction D2, a segment BR11 extending along the direction X1, and a segment BR12 extending along a direction opposite to the direction X1.

The segment ST11 and the segment ST12 are each provided between each adjacent pair of electrodes LE2. The segment ST11 and the segment ST12 are connected to each other to form a stem portion ST1 extending in a zigzag shape along the second direction Y. It can be said that the segment ST11 and the segment ST12 which constitute the stem portion ST1 extend in directions inclined by 30° clockwise and counterclockwise (direction D1 and direction D2), respectively, with respect to the second direction Y, which is the direction in which the wiring line WL1 extends.

The segment BR11 extends along the first direction X from the connection portion of the segment ST11 and the segment ST12 towards the central portion of the electrode LE1. The segment BR12 extends from the connection portion of the segment ST11 and the segment ST12 along a direction opposite to the first direction X toward the central portion of the electrode LE1. Each of the segment BR11 and the segment BR12 is connected to the central portion of the electrode LE1 via a contact hole not shown in the drawing.

The wiring line WL2 comprises a segment ST21 extending along the direction D1, a segment ST22 extending along the direction D2, a segment BR21 extending along the first direction X, and a segment BR22 extending along a direction opposite to the first direction X.

The segment ST21 and the segment ST22 are each provided between each adjacent pair of electrodes LE2. The segment ST21 and the segment ST22 are connected to form a stem portion ST2 extending in a zigzag shape along the second direction Y. It can be said that the segment ST21 and the segment ST22 which constitute the stem portion ST2 extend in directions (directions D1 and D2) inclined by 30° clockwise and counterclockwise, respectively, with respective to the second direction Y, which is the direction in which the wiring line WL2 extends.

The segment BR21 extends along the first direction X from the connection portion of the segment ST21 and the segment ST22 to the apex of the respective electrode LE2. The segment BR22 extends from the connection portion of the segment ST21 and the segment ST22 toward the apex of the electrode LE2, along a direction opposite to the first direction X. Each of the segment BR21 and the segment BR22 is connected to the electrode LE2 via a contact hole not shown in the drawing.

When the segment BR11 and the segment BR12 are not to be distinguished from each other, they are referred to as branch portions BR1. When the segment BR21 and the segment BR22 are not to be distinguished, they are referred to as branch portions BR2.

In Embodiment 3 as well, as in the case of Embodiment 1, only the branch portion BR1 of the electrode WL1 overlaps the electrode LE1 of the respective electrode pair LX. Therefore, the regions of the electrode LE1 and the electrode LE2, which are light-shielded by the wiring line WL1 and the wiring line WL2 can be suppressed. Thus, it is possible to improve the function of the liquid crystal lens.

Configuration Example 1 of Embodiment 3

Figure 15:
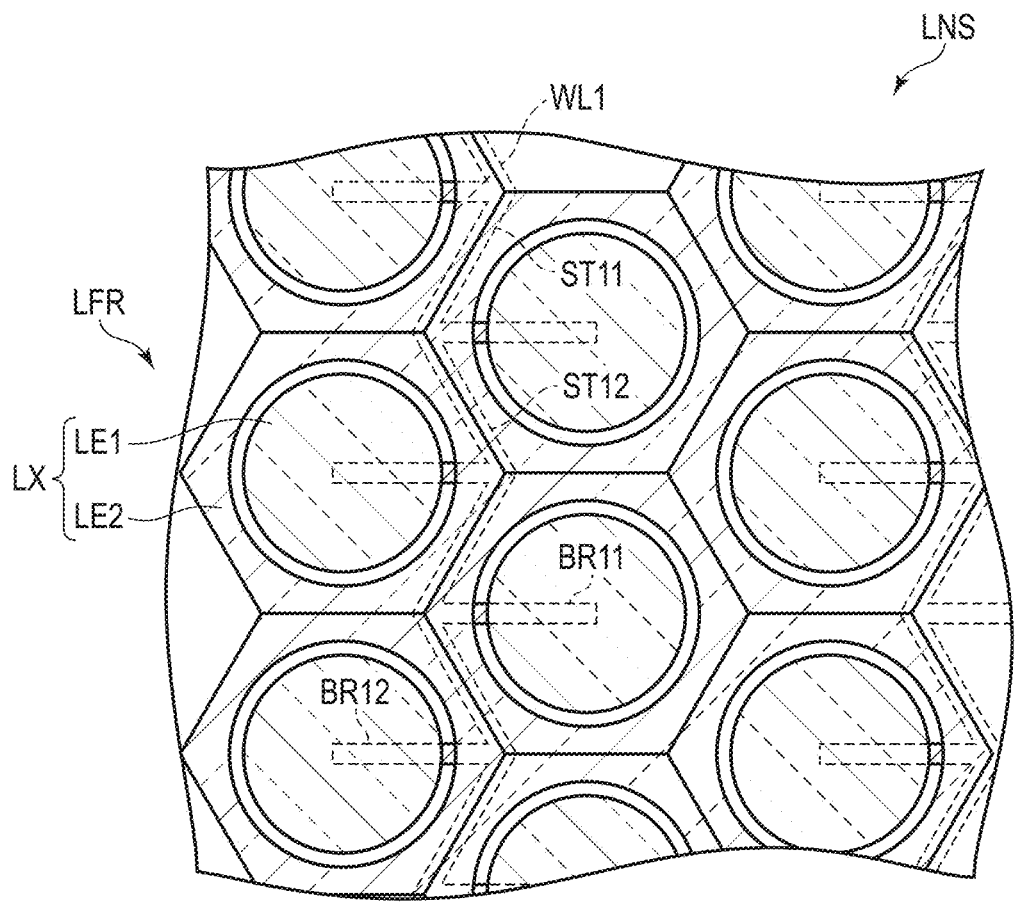
FIG. 15 is a plan view schematically showing a configuration example of the optical control element of Embodiment 3.

FIG. 15 is a plan view schematically showing a configuration example of the optical control element of Embodiment 3. The configuration example shown in FIG. 15 is different from that of 14 in that there is no wiring line to be connected to the electrode LE2.

The optical control element LNS shown in FIG. 15 is formed so that no gap is created between any adjacent pair of electrode pairs LX as in the case described above. More specifically, each adjacent pair of electrodes LE2 are integrally formed to be one body. In other words, all electrodes LE2 are formed into a so-called solid film.

Since all electrodes LE2 are integrally formed to be one body, there is no need to provide separate wiring lines (wiring line WL2 shown in FIG. 14) connecting to the electrodes LE2 in the lens forming regions LFR, respectively. Therefore, in the example shown in FIG. 15, only the wiring line WL1 connected to the electrode LE1 is formed.

In this configuration example as well, advantageous effects similar to those of Embodiment 3 embodiment can be exhibited.

Configuration Example 2 of Embodiment 3

Figure 16:
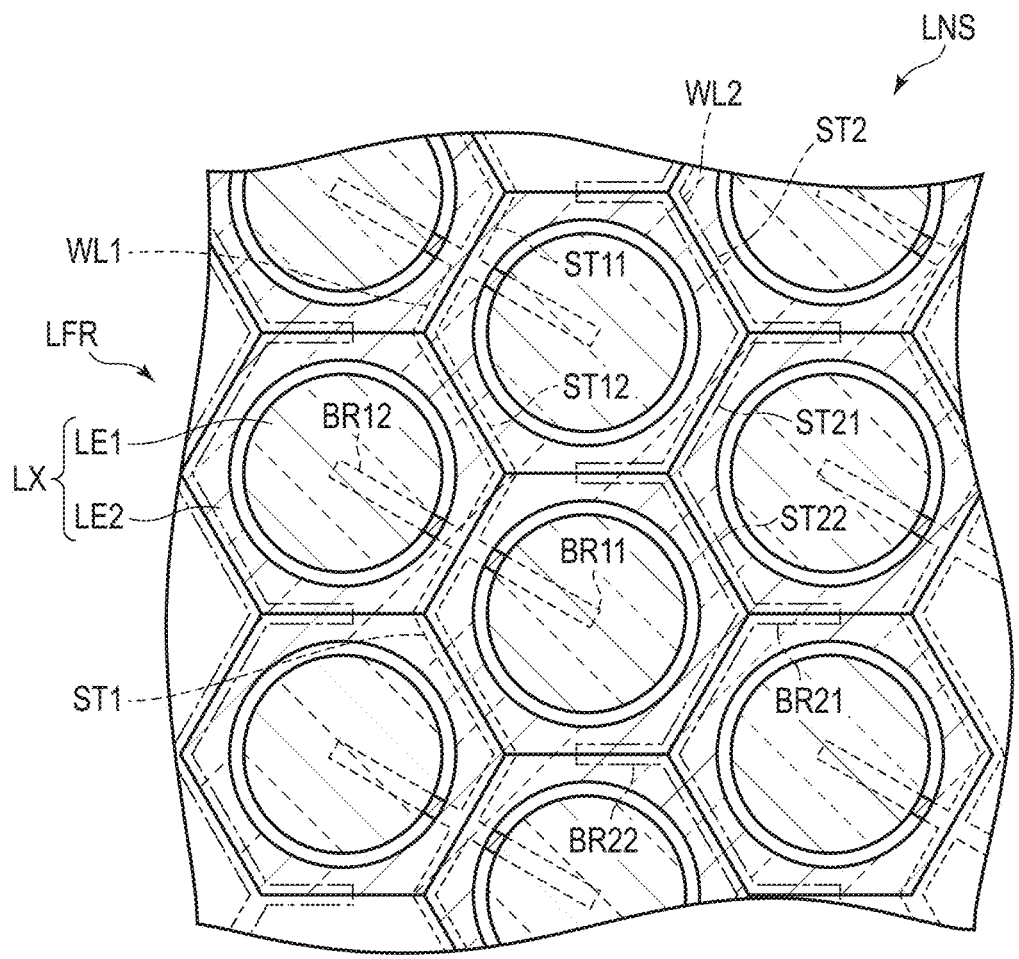
FIG. 16 is a plan view schematically showing a configuration example of the optical control element of Embodiment 3.
Figure 16:
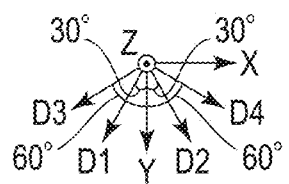

FIG. 16 is a plan view schematically showing a configuration example of the optical control element of Embodiment 3. The configuration example shown in FIG. 16 is different from that FIG. 14 in the direction in which the branch portions extend.

In an optical control element LNS shown in FIG. 16, a stem portion ST1 of a wiring line WL1 is similar to that of FIG. 14.

On the other hand, branch portions BR1 (segment BR11 and segment BR12) do not extend along the first direction X.

In FIG. 16, a direction inclined by 60° clockwise from the second direction Y is referred to as D3, and a direction inclined by 60° counterclockwise from the second direction Y is referred to D4.

The segment BR11 extends along the direction D4 from near the central portion of the segment ST11. The segment BR12 extends along a direction opposite to the direction D4 from near the central portion of the segment ST11. That is, the segment BR11 and the segment BR12 constitute an electrode segment extending along a direction parallel to the direction D4. The electrode section (segment BR11 and segment BR12) intersects the segment ST11 at an angle of 90°.

The segment BR11 overlaps the electrode LE1 of each electrode pair LX and extends to near the central portion of the electrode LE1. The segment BR12 extends from the same segment ST11 as the segment BR11, and the segment BR11 overlaps the electrode LE1 of the respective adjacent electrode pairs LX in the first direction X and the second direction Y. Each of the segment BR11 and the segment BR12 is connected to the central portion of the electrode LE1 via a contact hole not shown in the drawing.

In the optical control element LNS shown in FIG. 16, the segments BR11 and BR12 extend from the segment ST11, but the configuration is not limited to that of this example. The segments BR11 and BR12 may extend orthogonally from the segment ST12.

In the optical control element LNS shown in FIG. 16, the segment BR11 and the segment BR12 extend along a direction parallel to the direction D4, but the configuration is not limited to that of this example. Note that the segment BR11 and the segment BR12 may as well extend along a direction parallel to the direction D3.

In this configuration example as well, advantageous effects similar to those of Embodiment 3 embodiment can be exhibited.

Configuration Example 3 of Embodiment 3

Figure 17:
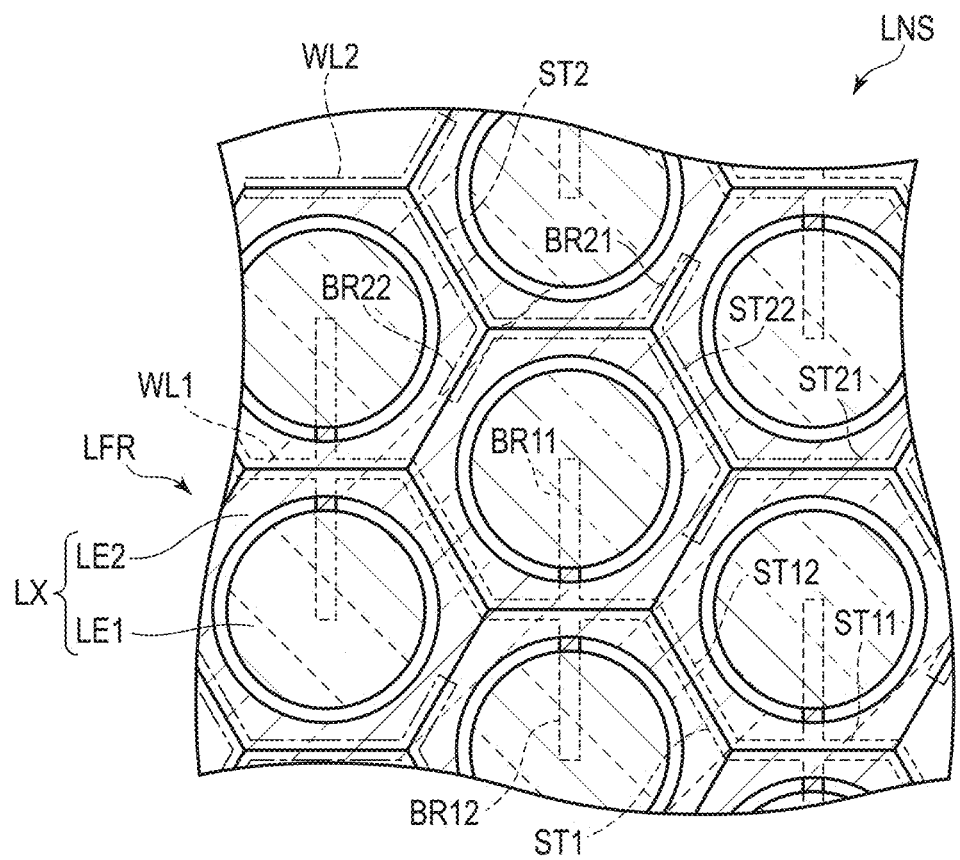
FIG. 17 is a plan view schematically showing a configuration example of the optical control element of Embodiment 3.

FIG. 17 is a plan view schematically showing a configuration example of the optical control element of Embodiment 3. The configuration example shown in FIG. 17 is different from that of the configuration example shown in FIG. 16 in the direction in which the stem portion is extended.

In the optical control element LNS shown in FIG. 17, the wiring line WL1 includes a segment ST11 extending along the first direction X, a segment ST12 extending along the direction D2, a segment BR11 extending along a direction opposite to the second direction Y, and a segment BR12 extending along the second direction Y.

The segment ST11 and the segment ST12 are connected to each other and extend along the direction D4 as a whole. That is, the segment ST11 extends in the first direction X and the segment ST12 extends along the direction D2. It can be said that the wiring line WL1 has a zigzag shape and extends along the direction D4 as a whole.

It can be said that the segment ST11 and the segment ST12 which constitute the stem portion ST1 extend in directions inclined by 30° counterclockwise and clockwise (first direction X and direction D2), respectively, with respect to the direction D4, which is the direction in which the wiring line WL1 extends.

It can also be the that the electrode segments formed from the segment BR11 and the segment BR12 extend along the second direction Y from around the central portion of the segment ST11, respectively, as in the case of the example shown in FIG. 16. The electrode segments formed from the segment BR11 and the segment BR12 are orthogonal to the segment ST11. Each of the segments BR11 and BR12 is connected to the central portion of the electrode LE1 via a contact hole not shown in the drawing.

The wiring line WL2 includes a segment ST21 extending along the first direction X, a segment ST22 extending along the direction D2, a segment BR21 extending along the direction D1, and a segment BR22 extending along a direction opposite to the direction D1.

The segment ST21 and the segment ST22 are connected to each other and extend along the direction D4 as a whole. In other words, the stem portion ST2 extends along the direction D4. Since the stem portion ST2 of the wiring line WL2 extends along the direction D4, it can be said that the wiring line WL2 has a zigzag shape and extends along the direction D4.

It can be said that the segment ST21 and the segment ST22 which constitute the stem portion ST2 extend in directions inclined by 30° counterclockwise and clockwise (first direction X and direction D2), respectively, with respect to the direction D4, which is the direction in which the wiring line WL2 extends.

The branch BR21 and the branch BR22 extend in a direction orthogonal to the direction D4 in which the wiring line WL2 extends. The branch BR21 extends in the direction D1. The branch BR22 extends in a direction opposite to the direction D1. Each of the segment BR21 and the segment BR22 is connected to the electrode LE2 via a contact hole not shown in the drawing.

Figure 18:
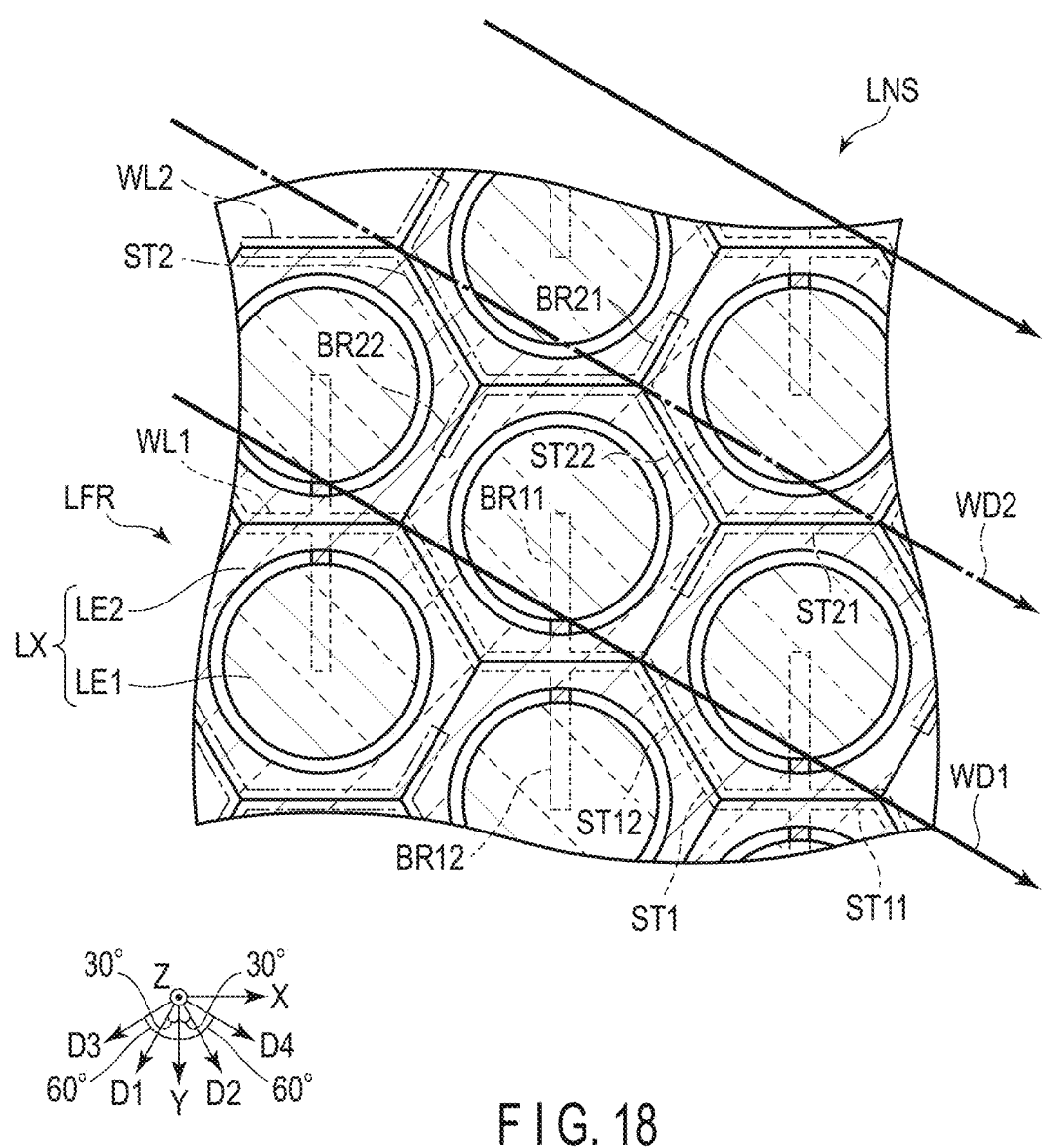
FIG. 18 is a plan view showing the direction of extension of wiring lines shown in FIG. 17.

FIG. 18 is a plan view showing the direction of extension of the wiring lines shown in FIG. 17. In FIG. 18, a direction WD1 in which the wiring line WL1 (stem portion ST1) extends is indicated by a solid arrow. A direction WD2 in which the wiring line WL2 (stem portion ST2) extends is indicated by a single-pointed arrow.

The direction WD1 and direction WD2 are equal to the direction D4 as described above. Even if the extension directions of the wiring line WL1 and the wiring line WL2 are different from each other as shown in FIG. 18, advantageous effects similar to those of Embodiment 3 can be exhibited.

FIG. 19 is a plan view schematically showing a configuration example of the optical control element of Embodiment 3. The configuration example shown in FIG. 19 is different from that of FIG. 18 in the direction of extensions of the branch portions.

The wiring line WL1 of the optical control element LNS shown in FIG. 19 has a shape obtained by combining those of the stem portion ST1 (segment ST11 and segment ST12) shown in FIG. 18 and the branch BR1 (segment BR11 and segment BR12) shown in FIG. 16. In other words, the stem portion ST1 extends along the direction D4. The segment BR11 and the segment BR12 extend from near the central portion of the segment ST12 and intersect at an angle of 90° with respect to the segment ST12. Each of the segment BR11 and the segment BR12 is connected to the central portion of the electrode LE1 via a contact hole not shown in the drawing. Each of the segment BR21 and the segment BR22 is connected to the electrode LE2 via a contact hole not shown in the drawing.

FIG. 20 is a plan view schematically showing a configuration example of the optical control element of Embodiment 3. The configuration example shown in FIG. 20 is different from that of FIG. 18 in the direction in which the stem extends.

In the example shown in FIG. 20, in order to make the drawing easier to read, the illustration of the wiring line WL1 and the wiring line WL2 is omitted and only the direction WD1 and the direction WD2, which are directions in which the wiring line WL1 and the wiring line WL2 respectively extend (the directions in which the stem portion ST1 and the stem portion ST2 respectively extend) are shown. In the example shown in FIG. 20, the direction WD1 and the direction WD2 are equal to the direction D1.

Although not shown in the drawing, the segment ST11 and the segment ST12 which constitute the stem portion ST1 extend in directions (second direction Y and direction D3) inclined by 30° counterclockwise and clockwise, respectively, with respect to the direction D1, which is the direction in which the wiring line WL1 extends.

Although not shown in the drawing, the segment ST21 and the segment ST22 which constitute the stem portion ST2 extend in directions inclined by 30° counterclockwise and clockwise (second direction Y and direction D3), respectively, with respect to the direction D1, which is the direction in which the wiring line WL2 extends.

Although not shown in the figure, the branch BR1 (segment BR11 and segment BR12) may as well extend in a direction orthogonal to the direction D1 in which the wiring line WL1 extends (the direction in which the stem portion ST1 extends) from the connection portion of the segment ST11 and the segment ST12, as in the case shown in FIG. 4. Alternatively, as in FIG. 16, the branch BR1 (segment BR11 and segment BR12) may as well extend from near the central portion of the segment ST11 in a direction orthogonal to the direction in which the segment ST11 extends. Still further, or alternatively, the branch portions BR1 (segment BR11 and BR12) may as well extend from near the central portion of the segment ST12 in a direction orthogonal to the direction in which the segment ST12 extends. Although not shown in the figure, each of the segment BR11 and the segment BR12 is connected to the central portion of the electrode LE1 via a contact hole.

The segment BR21 and the segment BR22 extend in a direction parallel to the direction D2, which is orthogonal to the direction D3 in which the stem portion ST2 extends. The segment BR21 and the segment BR22 are disposed between a respective pair of electrodes LE2 adjacent to each other and connected to the electrode LE2 as in the case described above.

FIG. 21 is a plan view schematically showing a configuration example of the optical control element of Embodiment 3. The configuration example shown in FIG. 21 is different from that of FIG. 20 in the direction in which the stem extends.

In the example shown in FIG. 21, the direction WD1 and the direction WD2 are equal to the first direction X. In other words, the wiring line WL1 and the wiring line WL2 (stem portion ST1 and stem portion ST2) each extend along the first direction X.

Although not shown in the drawing, the segment ST11 and the segment ST12 which constitute the stem portion ST1 extend in directions inclined by 30° counterclockwise and clockwise (direction opposite to direction D3 and direction D4), respectively, with respect to the first direction X, which is the direction in which the wiring line WL1 extends.

Although not shown in the drawing, the segment ST21 and the segment ST22 which constitute the stem portion ST2 extend in directions (direction opposite to direction D3 and direction D4) inclined by 30° counterclockwise and clockwise, respectively, with respect to the first direction X, which is the direction in which the wiring line WL2 extends.

The branch portions BR1 (segments BR11 and BR12) may as well extend along the second direction Y, which is orthogonal to the direction WD1, or may extend orthogonally to one of the segment ST11 and the segment ST12. Although not shown in the drawing, each of the segment BR11 and the segment BR12 is connected to the central portion of the electrode LE1 via a contact hole.

The branch portions BR2 (segment BR21 and segment BR22) extend along the second direction Y, which is orthogonal to the direction WD2. Although not shown in the drawing, each of the segment BR21 and the segment BR22 is connected to the electrode LE2 via a contact hole.

In this configuration example as well, advantageous effects similar to those of Embodiment 3 embodiment can be exhibited.

Configuration Example 4 of Embodiment 3

Figure 22:
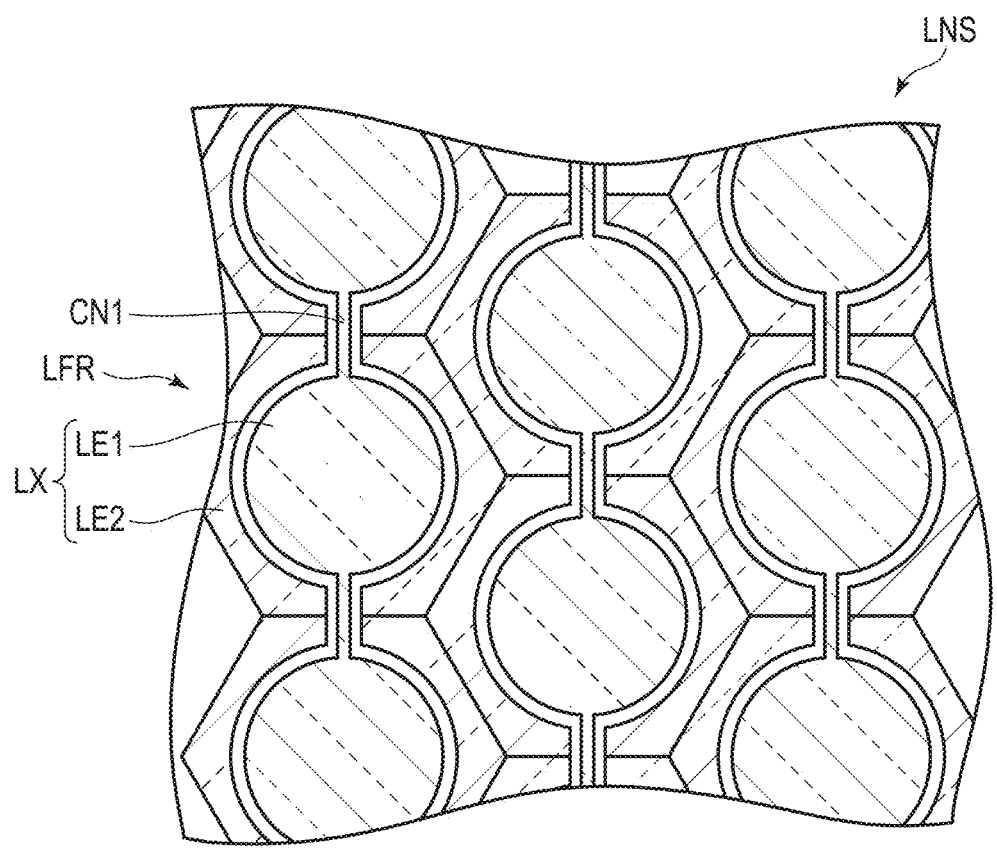
FIG. 22 is a plan view schematically showing another configuration example of the optical control element of Embodiment 3.
Figure 22:
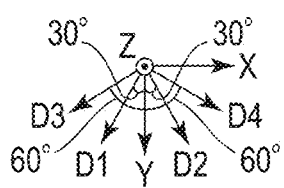

FIG. 22 is a plan view schematically showing a configuration example of the optical control element of Embodiment 3. The configuration example shown in FIG. 22 is different from that of FIG. 14 in that each adjacent pair of electrodes LE1 are connected to each other.

In the optical control element LNS shown in FIG. 22, each pair of electrodes LE1 adjacent to each other along the second direction Y are connected to each other by a connection portion CN1. The electrodes LE1, which are adjacent to each other along the second direction Y, and the connection portion CN1 are integrally formed to be one body and are formed into a so-called solid film. A gap is provided between the connection portion CN1 and the electrodes LE2 to prevent short-circuiting.

Since each pair of electrodes LE1 adjacent to each other along the second direction Y are connected to each other, a wiring line WL1 shown in FIG. 14 is not provided. As in the case shown in FIG. 15, adjacent electrodes LE2 may be integrally formed to be one body. In other words, all the electrodes LE2 may as well be formed into the so-called solid film. With this configuration, the optical control element LNS shown in FIG. 22 does not require a wiring line WL2 shown in FIG. 14 to be provided.

In this configuration example, wiring lines which light-shield the electrodes LE1 are provided. Therefore, it is possible to improve the function of the liquid crystal lens.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical control element comprising:
   a plurality of lens forming regions arranged in a closest packed arrangement in plane and along a first direction and a second direction orthogonal to the first direction, each of the plurality of lens forming regions comprising an annularly shaped second electrode and a circularly shaped first electrode provided on an inner side of the second electrode;
   a plurality of first wiring lines respectively connected to a plurality of the first electrodes each comprising a first stem portion extending in a zigzag shape along the second direction and a plurality of first branch portions extending from the first stem;
   a plurality of second wiring lines connected to a plurality of the second electrodes each comprising a second stem portion extending in a zigzag shape along the second direction and a plurality of second branch portions extending from the second stem, wherein
   the plurality of the first branch portions overlap the plurality of first electrodes, respectively.

2. The optical control element according to claim 1, wherein
   the plurality of the second branch portions each overlap each respective pair of second electrodes adjacent to each other.

3. The optical control element according to claim 2, wherein
   the first stem portion comprises:
   a first segment extending in a third direction inclined by 30° clockwise with respect to the second direction; and
   a second segment extending in a fourth direction inclined by 30° counterclockwise with respect to the second direction,
   the second stem comprises:
   a third segment extending in the third direction; and
   a fourth segment extending in the fourth direction,
   the plurality of first branch portions comprise:
   a plurality of fifth segments extending along the first direction from a connection portion of the respective first segment and the respective second segment; and
   a plurality of sixth segments extending along a direction opposite to the first direction from the connection portion of the first respective segment and the respective second segment, and
   the plurality of second branch portions comprise:
   a plurality of seventh segments extending along the first direction from a connection portion of the respective third segment and the respective fourth segment; and
   a plurality of eighth segments extending along a direction opposite to the first direction from the connection portion of the respective third segment and the respective fourth segment.

4. The optical control element according to claim 2, wherein
   the first stem portion comprises:
   a first segment extending in a third direction inclined by 30° clockwise with respect to the second direction; and
   a second segment extending in a fourth direction inclined by 30° counterclockwise with respect to the second direction,
   the second stem comprises:
   a third segment extending in the third direction; and
   a fourth segment extending in the fourth direction,
   the plurality of first branch portions comprise:
   a plurality of fifth segments extending along the third direction from a connection portion of the respective first segment and the respective second segment; and a plurality of sixth segments extending along a direction opposite to the fourth direction from the connection portion of the respective first segment and the respective second segment, the plurality of second branch portions comprise:

a plurality of seventh segments extending along the first direction from a connection portion of the respective third segment and the respective fourth segment; and a plurality of eighth segments extending along a direction opposite to the first direction from the connection portion of the respective third segment and the respective fourth segment.

5. The optical control element according to claim 1, wherein the plurality of lens forming regions form a plurality of rows along the second direction, and lines connecting centers of a respective pair of lens forming regions adjacent to each other, located in one of the plurality of rows, and one lens forming region included in a row adjacent to the one row along the first direction and in contact with the respective pair of adjacent lens forming regions, form an equilateral triangle.

6. The optical control device according to claim 1, comprising:

a first substrate;

a second substrate; and a liquid crystal layer disposed between the first substrate and the second substrate, wherein the first substrate comprises:

the plurality of circularly shaped first electrodes;

the plurality of annularly shaped second electrodes;

the plurality of first wiring lines connected to the plurality of first electrodes;

the plurality of second wiring lines connected to the plurality of second electrodes; and a high resistance layer provided on the plurality of first electrodes and the plurality of second electrodes, and the second substrate comprises a third electrode.

7. The optical control element according to claim 1, wherein the plurality of second wiring lines each comprises a second stem portion extending in a zigzag shape along the second direction, the plurality of second branch portions extending from the second stem, and a plurality of third branch portions extending from the plurality of second branch portions, the plurality of first branch portions overlap the plurality of first electrodes, respectively, and the plurality of third branch portions are each provided between each pair of lens forming regions adjacent to each other and spaced apart along the second direction.

8. An optical control element comprising:

a plurality of lens forming regions arranged squarely along a first direction and a second direction orthogonal to the first direction, each of the plurality of lens-forming regions comprising an annularly shaped second electrode and a circularly shaped first electrode provided in an inner side the second electrode;

a plurality of first wiring lines each comprising a first stem portion extending along the second direction and a plurality of first branch portions extending from the first stem portion; and a plurality of second wiring lines each comprising a second stem portion extending along the second direction and a plurality of second branch portions extending from the second stem portion, the plurality of the first branch portions overlap the plurality of first electrodes, respectively.

9. The optical control element according to claim 8, wherein lines connecting centers of a respective pair of lens forming regions adjacent to each other along the second direction and another respective pair of lens forming regions adjacent to the respective pair of lens forming regions along the first direction form a square.

10. The optical control device according to claim 8, further comprising:

a first substrate;

a second substrate; and a liquid crystal layer disposed between the first substrate and the second substrate, wherein the first substrate comprises:

a plurality of circularly shaped first electrodes;

a plurality of annularly shaped second electrodes; and a plurality of first wiring lines connected to the plurality of first electrodes;

a plurality of second wiring lines connected to the plurality of second electrodes; and a high resistance layer provided on the plurality of first electrodes and the plurality of second electrodes, and the second substrate comprises a third electrode.

11. The optical control element according to claim 8, wherein the plurality of second electrodes provided on the plurality of lens forming regions are in contact with each other in the first direction and the second direction, and the plurality of second branch portions each overlap each respective pair of second electrodes adjacent to each other.

12. The optical control element according to claim 8, wherein the plurality of second electrodes provided in the plurality of lens forming regions are spaced apart from each other in the first direction and the second direction, the second stem comprises a plurality of third branch portions extending from the plurality of second branch portions, and the plurality of third branch portions are each provided between each respective pair of lens forming regions spaced apart from and adjacent to each other along the second direction.

13. An optical control element comprising:

a plurality of lens forming regions forming a honeycomb structure along a first direction and a second direction orthogonal to the first direction, each of the plurality of lens-forming regions comprising a second electrode comprising an outer side end portion of a hexagonal shape and an inner side end portion of a circular shape, and a first electrode having a circular shape, provided on an inner side of the second electrode, wherein the plurality of first wiring lines each comprises a first stem portion extending in a zigzag shape along a predetermined direction, and a plurality of first branch portions extending from the first stem portion, and the plurality of first branch portions overlap the plurality of first electrodes, respectively.

14. The optical control element according to claim 13, wherein, the plurality of lens forming regions form a plurality of rows along the second direction, and lines connecting centers of a respective pair of lens forming regions adjacent to each other, located in one of the plurality of rows, and one lens forming region included in a row adjacent to the one row along the first direction and in contact with the respective pair of adjacent lens forming regions, form an equilateral triangle.

15. The optical control element according to claim 13, comprising:
a first substrate;
a second substrate; and
a liquid crystal layer disposed between the first substrate and the second substrate,
wherein
the first substrate comprises:
the plurality of circularly shaped first electrodes;
a plurality of second electrodes;
a plurality of first wiring lines connected to the plurality of first electrodes; and
a high resistance layer provided on the plurality of first electrodes and a plurality of second electrodes,
the second substrate comprises a third electrode, and
the plurality of second electrodes are in contact with each other.

16. The optical control element according to claim 13, wherein,
the first stem portion comprises:
a first segment extending in a third direction inclined by 30° clockwise with respect to a direction parallel to the predetermined direction; and
a second segment extending in a fourth direction inclined by 30° with respect to a direction parallel to the predetermined direction, and
the plurality of first branch portions extend from the first stem orthogonally to the predetermined direction.

17. The optical control element according to claim 13, wherein
the first stem portion comprises:
a first segment extending in a third direction inclined by 30° clockwise with respect to a direction parallel to the predetermined direction; and
a second segment extending in a fourth direction inclined by 30° with respect to a direction parallel to the predetermined direction, and
the plurality of first branch portions extend from the first stem portion orthogonally to a direction in which the first segment or the second segment extends.

18. The optical control element according to claim 13, further comprising:
a plurality of second wiring lines,
wherein
the plurality of second wiring lines each comprising a second stem portion extending in a zigzag shape along the predetermined direction and a plurality of second branch portions extending from the second stem orthogonally to the predetermined direction, and
the plurality of the second branch portions each overlap each respective pair of second electrodes adjacent to each other.

19. The optical control element according to claim 13, wherein
a direction inclined by 30° clockwise in the second direction is defined as a third direction, a direction inclined by 30° counterclockwise in the second direction is defined as a fourth direction, a direction inclined by 60° clockwise in the second direction is defined as a fifth direction, and a direction inclined by 60° counterclockwise in the second direction is defined as a sixth direction, and
the predetermined direction is the first direction, the second direction, the third direction, or the sixth direction.

* * * * *